(12) United States Patent
Jordan, II et al.

(10) Patent No.: US 11,815,864 B2
(45) Date of Patent: *Nov. 14, 2023

(54) SYSTEMS AND METHODS FOR MANAGING BUILDING CODE COMPLIANCE FOR A PROPERTY

(71) Applicant: State Farm Mutual Automobile Insurance Company, Bloomington, IL (US)

(72) Inventors: Jackie O. Jordan, II, Bloomington, IL (US); John Donovan, Bloomington, IL (US); David Turrentine, Normal, IL (US); Torri Wollenschlager, Bloomington, IL (US); Bryan R. Nussbaum, Bloomington, IL (US); Deanna Stockweather, Normal, IL (US); Jeffrey W. Stoiber, Dunwoody, GA (US); Kerstin Markwardt, Phoenix, AZ (US); Gail L Carlson, Bloomington, IL (US); Kyle C. Schiebel, Bloomington, IL (US); Troy Winslow, Bloomington, IL (US); Joseph P. Harr, Bloomington, IL (US); Ellakate Wagner, Mesa, AZ (US); Michael Harris, Jr., Tempe, AZ (US); Jennylind Sun, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/094,731

(22) Filed: Jan. 9, 2023

(65) Prior Publication Data

US 2023/0161305 A1     May 25, 2023

Related U.S. Application Data

(63) Continuation of application No. 16/674,140, filed on Nov. 5, 2019, now Pat. No. 11,551,235, which is a
(Continued)

(51) Int. Cl.
*G06Q 30/018* (2023.01)
*G06Q 50/16* (2012.01)
(Continued)

(52) U.S. Cl.
CPC .......... *G05B 15/02* (2013.01); *G01C 21/20* (2013.01); *G06Q 10/20* (2013.01); *G06Q 30/01* (2013.01);
(Continued)

(58) Field of Classification Search
CPC .............................. G06Q 20/00; G06Q 40/00
(Continued)

(56) References Cited

U.S. PATENT DOCUMENTS 1,042,341 A    10/1912   Harrington
3,740,739 A    6/1973   Griffin et al.
(Continued)

FOREIGN PATENT DOCUMENTS

| CN | 202865924 U | 4/2013 |
|---|---|---|
| WO | 2013/076721 A1 | 5/2013 |
| WO | 2014/207558 A2 | 12/2014 |

OTHER PUBLICATIONS

Knutsen, Confusion about causation in insurance: solutions for catastrophic losses, Ala. L. Rev., 5:957-1023 (2010).
(Continued)

*Primary Examiner* — Kirsten S Apple
(74) *Attorney, Agent, or Firm* — Faegre Drinker Biddle & Reath

(57) ABSTRACT

Methods and systems that manage building code compliance are provided. A smart or interconnected home may be
(Continued)

populated with multiple smart or other devices that are in wired or wireless communication with a central controller. The smart devices may be covered by an insurance policy, such as a homeowners, renters, or personal articles insurance policy. The controller may receive building code compliance information associated with the smart devices, and may update an inventory list to include the building code compliance information. The controller may detect that one or more devices do not comply with building code requirements. The controller may transmit a notification to a customer about possible corrective actions to remedy non-compliant conditions and to facilitate building code compliance. The smart devices may be associated with appliances, electronics, wiring, pipes, ducts, or other equipment or personal belongings. Insurance discounts may be provided based upon the building code compliance functionality.

20 Claims, 11 Drawing Sheets

Related U.S. Application Data continuation of application No. 14/873,817, filed on Oct. 2, 2015, now Pat. No. 10,515,372.

(60) Provisional application No. 62/220,383, filed on Sep. 18, 2015, provisional application No. 62/201,671, filed on Aug. 6, 2015, provisional application No. 62/200,375, filed on Aug. 3, 2015, provisional application No. 62/198,813, filed on Jul. 30, 2015, provisional application No. 62/197,343, filed on Jul. 27, 2015, provisional application No. 62/193,317, filed on Jul. 16, 2015, provisional application No. 62/189,329, filed on Jul. 7, 2015, provisional application No. 62/187,666, filed on Jul. 1, 2015, provisional application No. 62/187,651, filed on Jul. 1, 2015, provisional application No. 62/187,624, filed on Jul. 1, 2015, provisional application No. 62/187,645, filed on Jul. 1, 2015, provisional application No. 62/187,642, filed on Jul. 1, 2015, provisional application No. 62/105,407, filed on Jan. 20, 2015, provisional application No. 62/060,962, filed on Oct. 7, 2014.

(51) Int. Cl.

| | |
|---|---|
| *G06Q 30/01* | (2023.01) |
| *G06V 40/16* | (2022.01) |
| *G06Q 40/08* | (2012.01) |
| *G06Q 10/20* | (2023.01) |
| *G05B 15/02* | (2006.01) |
| *H04L 12/28* | (2006.01) |
| *G01C 21/20* | (2006.01) |
| *H04W 4/024* | (2018.01) |
| *G08B 13/22* | (2006.01) |
| *G08B 21/04* | (2006.01) |
| *G08B 21/18* | (2006.01) |
| *H04W 4/02* | (2018.01) |
| *H04N 23/661* | (2023.01) |
| *G08B 7/06* | (2006.01) |
| *G08B 17/10* | (2006.01) |
| *H04L 67/12* | (2022.01) |
| *G08B 1/02* | (2006.01) |
| *G08B 21/02* | (2006.01) |
| *H04W 4/90* | (2018.01) |

(52) U.S. Cl.
CPC ........... *G06Q 30/018* (2013.01); *G06Q 40/08* (2013.01); *G06Q 50/163* (2013.01); *G06V 40/172* (2022.01); *G08B 1/02* (2013.01); *G08B 7/062* (2013.01); *G08B 7/066* (2013.01); *G08B 13/22* (2013.01); *G08B 17/10* (2013.01); *G08B 21/043* (2013.01); *G08B 21/0446* (2013.01); *G08B 21/0461* (2013.01); *G08B 21/182* (2013.01); *G08B 21/185* (2013.01); *H04L 12/283* (2013.01); *H04L 12/2818* (2013.01); *H04L 12/2825* (2013.01); *H04L 67/12* (2013.01); *H04N 23/661* (2023.01); *H04W 4/02* (2013.01); *H04W 4/024* (2018.02); *G08B 21/0453* (2013.01); *H04W 4/90* (2018.02)

(58) Field of Classification Search
USPC ..................................................... 705/35, 38
See application file for complete search history.

(56) References Cited

U.S. PATENT DOCUMENTS

| | | | |
|---|---|---|---|
| 3,817,161 A | 6/1974 | Koplon | |
| 3,875,612 A | 4/1975 | Poitras | |
| 4,066,072 A | 1/1978 | Cummins | |
| 5,005,125 A | 4/1991 | Farrar et al. | |
| 5,099,751 A | 3/1992 | Newman et al. | |
| 5,128,859 A | 7/1992 | Carbone et al. | |
| 5,554,433 A | 9/1996 | Perrone et al. | |
| 5,576,952 A | 11/1996 | Stutman et al. | |
| 5,684,710 A | 11/1997 | Ehlers et al. | |
| 5,884,289 A | 3/1999 | Anderson et al. | |
| 5,903,426 A | 5/1999 | Ehling | |
| 6,023,762 A | 2/2000 | Dean et al. | |
| 6,026,166 A | 2/2000 | Lebourgeois | |
| 6,155,324 A | 12/2000 | Elliott et al. | |
| 6,222,455 B1 | 4/2001 | Kaiser | |
| 6,286,682 B1 | 9/2001 | Rodolfo | |
| 6,324,516 B1 | 11/2001 | Shults et al. | |
| 6,466,921 B1 | 10/2002 | Cordery et al. | |
| 6,526,807 B1 | 3/2003 | Doumit et al. | |
| 6,535,855 B1 | 3/2003 | Cahill et al. | |
| 6,554,183 B1 | 4/2003 | Sticha et al. | |
| 6,812,848 B2 | 11/2004 | Candela | |
| 6,826,536 B1 | 11/2004 | Forman | |
| 6,934,692 B1 * | 8/2005 | Duncan | G06Q 20/10 |
| | | | 705/26.25 |
| 6,954,758 B1 | 10/2005 | O'Flaherty | |
| 7,030,767 B2 | 4/2006 | Candela | |
| 7,194,416 B1 | 3/2007 | Provost et al. | |
| 7,309,216 B1 | 12/2007 | Spadola et al. | |
| 7,319,990 B1 | 1/2008 | Henty | |
| 7,340,401 B1 | 3/2008 | Koenig et al. | |
| 7,348,882 B2 | 3/2008 | Adamczyk et al. | |
| 7,356,516 B2 * | 4/2008 | Richey | G06Q 30/0253 |
| | | | 705/16 |
| 7,395,219 B2 * | 7/2008 | Strech | G06Q 40/00 |
| | | | 705/4 |
| 7,467,094 B2 | 12/2008 | Rosenfeld et al. | |
| 7,598,856 B1 | 10/2009 | Nick et al. | |
| 7,657,441 B2 * | 2/2010 | Richey | G06Q 20/403 |
| | | | 705/30 |
| 7,715,036 B2 | 5/2010 | Silverbrook et al. | |
| 7,809,587 B2 | 10/2010 | Dorai et al. | |
| 7,813,822 B1 | 10/2010 | Hoffberg | |
| 8,031,079 B2 | 10/2011 | Kates | |
| 8,041,636 B1 | 10/2011 | Hunter et al. | |
| 8,106,769 B1 | 1/2012 | Maroney et al. | |
| 8,108,271 B1 | 1/2012 | Duncan et al. | |
| 8,117,349 B2 | 2/2012 | Murata et al. | |
| 8,140,418 B1 | 3/2012 | Casey et al. | |
| 8,229,861 B1 | 7/2012 | Trandal et al. | |
| 8,280,633 B1 | 10/2012 | Eldering et al. | |
| 8,289,160 B1 | 10/2012 | Billman | |

(56) References Cited

U.S. PATENT DOCUMENTS

| | | |
|---|---|---|
| 8,311,941 B2 | 11/2012 | Grant |
| 8,316,237 B1 | 11/2012 | Felsher et al. |
| 8,400,299 B1 | 3/2013 | Maroney et al. |
| 8,490,006 B1 | 7/2013 | Reeser et al. |
| 8,510,196 B1 | 8/2013 | Brandmaier et al. |
| 8,527,306 B1 | 9/2013 | Reeser et al. |
| 8,533,144 B1 | 9/2013 | Reeser et al. |
| 8,571,993 B2 | 10/2013 | Kocher et al. |
| 8,595,034 B2 | 11/2013 | Bauer et al. |
| 8,596,293 B2 | 12/2013 | Mous et al. |
| 8,605,209 B2 | 12/2013 | Becker |
| 8,620,841 B1 | 12/2013 | Filson et al. |
| 8,621,097 B2 | 12/2013 | Venkatakrishnan et al. |
| 8,640,038 B1 | 1/2014 | Reeser et al. |
| 8,650,048 B1 | 2/2014 | Hopkins et al. |
| 8,665,084 B2 | 3/2014 | Shapiro et al. |
| 8,694,501 B1 | 4/2014 | Trandal et al. |
| 8,712,893 B1 | 4/2014 | Brandmaier et al. |
| 8,730,039 B1 | 5/2014 | Billman |
| 8,731,975 B2 | 5/2014 | English et al. |
| 8,749,381 B1 | 6/2014 | Maroney et al. |
| 8,890,680 B2 | 11/2014 | Reeser et al. |
| 8,917,186 B1 | 12/2014 | Grant |
| 8,976,937 B2 | 3/2015 | Shapiro et al. |
| 9,049,168 B2 | 6/2015 | Jacob et al. |
| 9,057,746 B1 | 6/2015 | Houlette et al. |
| 9,142,119 B1 | 9/2015 | Grant |
| 9,152,737 B1 | 10/2015 | Micali et al. |
| 9,183,578 B1 | 11/2015 | Reeser et al. |
| 9,202,363 B1 | 12/2015 | Grant |
| 9,262,909 B1 | 2/2016 | Grant |
| 9,280,252 B1 | 3/2016 | Brandmaier et al. |
| 9,286,772 B2 | 3/2016 | Shapiro et al. |
| 9,297,150 B2 | 3/2016 | Klicpera |
| 9,344,330 B2 | 5/2016 | Jacob et al. |
| D764,461 S | 8/2016 | Romanoff et al. |
| 9,424,606 B2 | 8/2016 | Wilson et al. |
| 9,424,737 B2 | 8/2016 | Bailey et al. |
| 9,429,925 B2 | 8/2016 | Wait |
| 9,443,195 B2 | 9/2016 | Micali et al. |
| 9,472,092 B1 | 10/2016 | Grant |
| 9,589,441 B2 | 3/2017 | Shapiro et al. |
| 9,609,003 B1 | 3/2017 | Chmielewski et al. |
| 9,652,976 B2 | 5/2017 | Bruck et al. |
| 9,654,434 B2 | 5/2017 | Sone et al. |
| 9,665,892 B1 | 5/2017 | Reeser et al. |
| 9,666,060 B2 | 5/2017 | Reeser et al. |
| 9,699,529 B1 | 7/2017 | Petri et al. |
| 9,739,813 B2 | 8/2017 | Houlette et al. |
| 9,786,158 B2 | 10/2017 | Beaver et al. |
| 9,798,979 B2 | 10/2017 | Fadell et al. |
| 9,798,993 B2 | 10/2017 | Payne et al. |
| 9,800,570 B1 | 10/2017 | Bleisch |
| 9,800,958 B1 | 10/2017 | Petri et al. |
| 9,812,001 B1 | 11/2017 | Grant |
| 9,824,397 B1 | 11/2017 | Patel et al. |
| 9,888,371 B1 | 2/2018 | Jacob |
| 9,892,463 B1 | 2/2018 | Hakimi et al. |
| 9,898,168 B2 | 2/2018 | Shapiro et al. |
| 9,898,912 B1 | 2/2018 | Jordan et al. |
| 9,911,042 B1 | 3/2018 | Cardona et al. |
| 9,923,971 B2 | 3/2018 | Madey et al. |
| 9,942,630 B1 | 4/2018 | Petri et al. |
| 9,947,202 B1 | 4/2018 | Moon et al. |
| 9,978,033 B1 | 5/2018 | Payne et al. |
| 9,997,056 B2 | 6/2018 | Bleisch |
| 10,002,295 B1 | 6/2018 | Cardona et al. |
| 10,047,974 B1 | 8/2018 | Riblet et al. |
| 10,055,793 B1 | 8/2018 | Call et al. |
| 10,055,803 B2 | 8/2018 | Orduna et al. |
| 10,057,664 B1 | 8/2018 | Moon et al. |
| 10,073,929 B2 | 9/2018 | Vaynriber et al. |
| 10,102,584 B1 | 10/2018 | Devereaux et al. |
| 10,102,585 B1 | 10/2018 | Bryant et al. |
| 10,107,708 B1 | 10/2018 | Schick et al. |
| 10,142,394 B2 | 11/2018 | Chmielewski et al. |
| 10,176,705 B1 | 1/2019 | Grant |
| 10,181,160 B1 | 1/2019 | Hakimi-Boushehri et al. |
| 10,186,134 B1 | 1/2019 | Moon et al. |
| 10,198,771 B1 | 2/2019 | Madigan et al. |
| 10,217,068 B1 | 2/2019 | Davis et al. |
| 10,229,394 B1 | 3/2019 | Davis et al. |
| 10,244,294 B1 | 3/2019 | Moon et al. |
| 10,249,158 B1 | 4/2019 | Jordan et al. |
| 10,282,787 B1 | 5/2019 | Hakimi-Boushehri et al. |
| 10,282,788 B1 | 5/2019 | Jordan et al. |
| 10,282,961 B1 | 5/2019 | Jordan et al. |
| 10,295,431 B1 | 5/2019 | Schick et al. |
| 10,297,138 B2 | 5/2019 | Reeser et al. |
| 10,304,313 B1 | 5/2019 | Moon et al. |
| 10,323,860 B1 | 6/2019 | Riblet et al. |
| 10,325,473 B1 | 6/2019 | Moon et al. |
| 10,332,059 B2 | 6/2019 | Matsuoka et al. |
| 10,346,811 B1 | 7/2019 | Jordan et al. |
| 10,353,359 B1 | 7/2019 | Jordan et al. |
| 10,356,303 B1 | 7/2019 | Jordan et al. |
| 10,387,966 B1 | 8/2019 | Shah et al. |
| 10,388,135 B1 | 8/2019 | Jordan et al. |
| 10,412,169 B1 | 9/2019 | Madey et al. |
| 10,446,000 B2 | 10/2019 | Friar et al. |
| 10,467,476 B1 | 11/2019 | Cardona et al. |
| 10,480,825 B1 | 11/2019 | Riblet et al. |
| 10,482,746 B1 | 11/2019 | Moon et al. |
| 10,506,411 B1 | 12/2019 | Jacob |
| 10,514,669 B1 | 12/2019 | Call et al. |
| 10,515,372 B1 | 12/2019 | Jordan et al. |
| 10,522,009 B1 | 12/2019 | Jordan et al. |
| 10,546,478 B1 | 1/2020 | Moon et al. |
| 10,547,918 B1 | 1/2020 | Moon et al. |
| 10,565,541 B2 | 2/2020 | Payne et al. |
| 10,573,146 B1 | 2/2020 | Jordan et al. |
| 10,573,149 B1 | 2/2020 | Jordan et al. |
| 10,579,028 B1 | 3/2020 | Jacob |
| 10,586,177 B1 | 3/2020 | Choueiter et al. |
| 10,607,295 B1 | 3/2020 | Hakimi-Boushehri et al. |
| 10,634,576 B1 | 4/2020 | Schick et al. |
| 10,679,292 B1 | 6/2020 | Call et al. |
| 10,685,402 B1 | 6/2020 | Bryant et al. |
| 10,726,494 B1 | 7/2020 | Shah et al. |
| 10,726,500 B1 | 7/2020 | Shah et al. |
| 10,733,671 B1 | 8/2020 | Hakimi-Boushehri et al. |
| 10,733,868 B2 | 8/2020 | Moon et al. |
| 10,735,829 B2 | 8/2020 | Petri et al. |
| 10,740,691 B2 | 8/2020 | Choueiter et al. |
| 10,741,033 B1 | 8/2020 | Jordan et al. |
| 10,750,252 B2 | 8/2020 | Petri et al. |
| 10,795,329 B1 | 10/2020 | Jordan et al. |
| 10,796,557 B2 | 10/2020 | Sundermeyer et al. |
| 10,823,458 B1 | 11/2020 | Riblet et al. |
| 10,824,971 B1 | 11/2020 | Davis et al. |
| 10,825,320 B1 | 11/2020 | Moon et al. |
| 10,825,321 B2 | 11/2020 | Moon et al. |
| 10,832,225 B1 | 11/2020 | Davis et al. |
| 10,846,800 B1 | 11/2020 | Bryant et al. |
| 10,922,756 B1 | 2/2021 | Call et al. |
| 10,922,948 B1 | 2/2021 | Moon et al. |
| 10,943,447 B1 | 3/2021 | Jordan et al. |
| 10,970,990 B1 | 4/2021 | Jacob |
| 10,990,069 B1 | 4/2021 | Jacob |
| 11,004,320 B1 | 5/2021 | Jordan et al. |
| 11,015,997 B1 | 5/2021 | Schick et al. |
| 11,017,480 B2 | 5/2021 | Shah et al. |
| 11,042,137 B1 | 6/2021 | Call et al. |
| 11,042,938 B1 | 6/2021 | Robare |
| 11,042,942 B1 | 6/2021 | Hakimi-Boushehri et al. |
| 11,043,098 B1 | 6/2021 | Jordan et al. |
| 11,049,078 B1 | 6/2021 | Jordan et al. |
| 11,049,189 B2 | 6/2021 | Shah et al. |
| 11,074,659 B1 | 7/2021 | Hakimi-Boushehri et al. |
| 11,118,812 B1 | 9/2021 | Riblet et al. |
| 11,126,708 B2 | 9/2021 | Reimer |
| 2002/0040306 A1 | 4/2002 | Sugiyama et al. |
| 2004/0054789 A1 | 3/2004 | Breh et al. |
| 2004/0153346 A1 | 8/2004 | Grundel et al. |

(56) References Cited

U.S. PATENT DOCUMENTS

| | | | |
|---|---|---|---|
| 2004/0153382 A1* | 8/2004 | Boccuzzi | H04M 15/73 705/34 |
| 2004/0177032 A1 | 9/2004 | Bradley et al. | |
| 2004/0211228 A1 | 10/2004 | Nishio et al. | |
| 2005/0030175 A1 | 2/2005 | Wolfe | |
| 2005/0080520 A1 | 4/2005 | Kline et al. | |
| 2005/0139420 A1 | 6/2005 | Spoltore et al. | |
| 2005/0143956 A1 | 6/2005 | Long et al. | |
| 2005/0275527 A1 | 12/2005 | Kates | |
| 2006/0033625 A1 | 2/2006 | Johnson et al. | |
| 2006/0058612 A1 | 3/2006 | Dave et al. | |
| 2006/0100912 A1 | 5/2006 | Kumar et al. | |
| 2006/0154642 A1 | 7/2006 | Scannell, Jr. | |
| 2006/0184379 A1 | 8/2006 | Tan et al. | |
| 2006/0271456 A1 | 11/2006 | Romain et al. | |
| 2008/0018474 A1 | 1/2008 | Bergman et al. | |
| 2008/0019392 A1 | 1/2008 | Lee | |
| 2008/0045274 A1 | 2/2008 | Witkowski et al. | |
| 2008/0059351 A1* | 3/2008 | Richey | G06Q 20/20 705/35 |
| 2008/0101160 A1 | 5/2008 | Besson | |
| 2008/0184272 A1 | 7/2008 | Brownewell | |
| 2008/0285797 A1 | 11/2008 | Hammadou | |
| 2008/0301019 A1 | 12/2008 | Monk | |
| 2009/0001891 A1 | 1/2009 | Patterson | |
| 2009/0024420 A1* | 1/2009 | Winkler | G06Q 40/08 705/4 |
| 2009/0044595 A1 | 2/2009 | Vokey | |
| 2009/0094129 A1 | 4/2009 | Rhodes et al. | |
| 2009/0243852 A1 | 10/2009 | Haupt et al. | |
| 2009/0259581 A1 | 10/2009 | Horowitz et al. | |
| 2009/0265193 A1 | 10/2009 | Collins et al. | |
| 2010/0027777 A1 | 2/2010 | Gupta et al. | |
| 2010/0073840 A1 | 3/2010 | Hennessey, Jr. | |
| 2010/0131416 A1* | 5/2010 | Means | G06Q 10/00 705/300 |
| 2010/0235285 A1 | 9/2010 | Hoffberg | |
| 2010/0241465 A1 | 9/2010 | Amigo et al. | |
| 2010/0299217 A1 | 11/2010 | Hui | |
| 2011/0003577 A1 | 1/2011 | Rogalski et al. | |
| 2011/0077875 A1 | 3/2011 | Tran et al. | |
| 2011/0112660 A1 | 5/2011 | Bergmann et al. | |
| 2011/0161117 A1 | 6/2011 | Busque et al. | |
| 2011/0173122 A1 | 7/2011 | Singhal | |
| 2011/0218827 A1 | 9/2011 | Kenefick et al. | |
| 2011/0238564 A1 | 9/2011 | Lim et al. | |
| 2011/0251807 A1 | 10/2011 | Rada et al. | |
| 2011/0276489 A1 | 11/2011 | Larkin | |
| 2012/0016695 A1 | 1/2012 | Bernard et al. | |
| 2012/0046973 A1* | 2/2012 | Eshleman | G06Q 40/08 705/500 |
| 2012/0047072 A1 | 2/2012 | Larkin | |
| 2012/0101855 A1 | 4/2012 | Collins et al. | |
| 2012/0116820 A1 | 5/2012 | English et al. | |
| 2012/0143754 A1 | 6/2012 | Patel | |
| 2012/0166115 A1 | 6/2012 | Apostolakis | |
| 2012/0188081 A1 | 7/2012 | Van Katwijk | |
| 2012/0232935 A1* | 9/2012 | Voccola | G06Q 40/08 705/4 |
| 2012/0237908 A1 | 9/2012 | Fitzgerald et al. | |
| 2012/0265586 A1 | 10/2012 | Mammone | |
| 2012/0290333 A1 | 11/2012 | Birchall | |
| 2012/0290482 A1 | 11/2012 | Atef et al. | |
| 2013/0013513 A1 | 1/2013 | Ledbetter et al. | |
| 2013/0030974 A1 | 1/2013 | Casey et al. | |
| 2013/0049950 A1 | 2/2013 | Wohlert | |
| 2013/0073321 A1* | 3/2013 | Hofmann | G06Q 10/10 705/4 |
| 2013/0104022 A1 | 4/2013 | Coon | |
| 2013/0144486 A1 | 6/2013 | Ricci | |
| 2013/0159021 A1 | 6/2013 | Felsher | |
| 2013/0166325 A1* | 6/2013 | Ganapathy | G06Q 40/08 705/4 |
| 2013/0226624 A1 | 8/2013 | Blessman et al. | |
| 2013/0234840 A1 | 9/2013 | Trundle et al. | |
| 2013/0257626 A1 | 10/2013 | Masli et al. | |
| 2013/0290013 A1 | 10/2013 | Forrester | |
| 2013/0290033 A1 | 10/2013 | Reeser et al. | |
| 2013/0304514 A1 | 11/2013 | Hyde et al. | |
| 2014/0006284 A1 | 1/2014 | Faith et al. | |
| 2014/0058854 A1 | 2/2014 | Ranganath et al. | |
| 2014/0122133 A1 | 5/2014 | Weisberg et al. | |
| 2014/0136242 A1 | 5/2014 | Weekes et al. | |
| 2014/0180723 A1 | 6/2014 | Cote et al. | |
| 2014/0201844 A1 | 7/2014 | Buck | |
| 2014/0222329 A1 | 8/2014 | Frey | |
| 2014/0222469 A1 | 8/2014 | Stahl et al. | |
| 2014/0229205 A1* | 8/2014 | Gibson | G06Q 40/08 705/4 |
| 2014/0244997 A1 | 8/2014 | Goel et al. | |
| 2014/0257871 A1* | 9/2014 | Christensen | B60Q 1/00 705/4 |
| 2014/0266669 A1 | 9/2014 | Fadell et al. | |
| 2014/0266717 A1 | 9/2014 | Warren et al. | |
| 2014/0278571 A1 | 9/2014 | Mullen et al. | |
| 2014/0303801 A1 | 10/2014 | Ahn et al. | |
| 2014/0340216 A1 | 11/2014 | Puskarich | |
| 2014/0358592 A1 | 12/2014 | Wedig et al. | |
| 2014/0379156 A1 | 12/2014 | Kamel et al. | |
| 2015/0032480 A1* | 1/2015 | Blackhurst | G06Q 40/08 705/4 |
| 2015/0116112 A1 | 4/2015 | Flinsenberg et al. | |
| 2015/0154712 A1 | 6/2015 | Cook | |
| 2015/0160623 A1 | 6/2015 | Holley | |
| 2015/0160636 A1 | 6/2015 | Mccarthy et al. | |
| 2015/0163412 A1 | 6/2015 | Holley et al. | |
| 2015/0170288 A1 | 6/2015 | Harton et al. | |
| 2015/0187019 A1 | 7/2015 | Fernandes et al. | |
| 2015/0206249 A1 | 7/2015 | Fini | |
| 2015/0287310 A1 | 10/2015 | Deiiuliis et al. | |
| 2015/0305690 A1 | 10/2015 | Tan et al. | |
| 2015/0364028 A1 | 12/2015 | Child et al. | |
| 2016/0018226 A1 | 1/2016 | Plocher et al. | |
| 2016/0042463 A1 | 2/2016 | Gillespie | |
| 2016/0078744 A1 | 3/2016 | Gieck | |
| 2016/0104250 A1 | 4/2016 | Allen et al. | |
| 2016/0119424 A1 | 4/2016 | Kane et al. | |
| 2016/0188829 A1 | 6/2016 | Southerland et al. | |
| 2016/0337829 A1 | 11/2016 | Fletcher et al. | |
| 2017/0147722 A1 | 5/2017 | Greenwood | |
| 2017/0304659 A1 | 10/2017 | Chen et al. | |
| 2018/0000346 A1 | 1/2018 | Cronin | |
| 2018/0160988 A1 | 6/2018 | Miller et al. | |
| 2020/0302549 A1 | 9/2020 | Jordan et al. | |
| 2020/0327791 A1 | 10/2020 | Moon et al. | |
| 2021/0035432 A1 | 2/2021 | Moon et al. | |
| 2021/0042843 A1 | 2/2021 | Bryant et al. | |
| 2021/0158671 A1 | 5/2021 | Jordan et al. | |

OTHER PUBLICATIONS

Michael E. Porter, "How Smart, Connected Products Are Transforming Competition", Harvard Business Review, Nov. 2014 (Year: 2014).

System for Loss Prevention, IP.com, published Nov. 8, 2008.

* cited by examiner

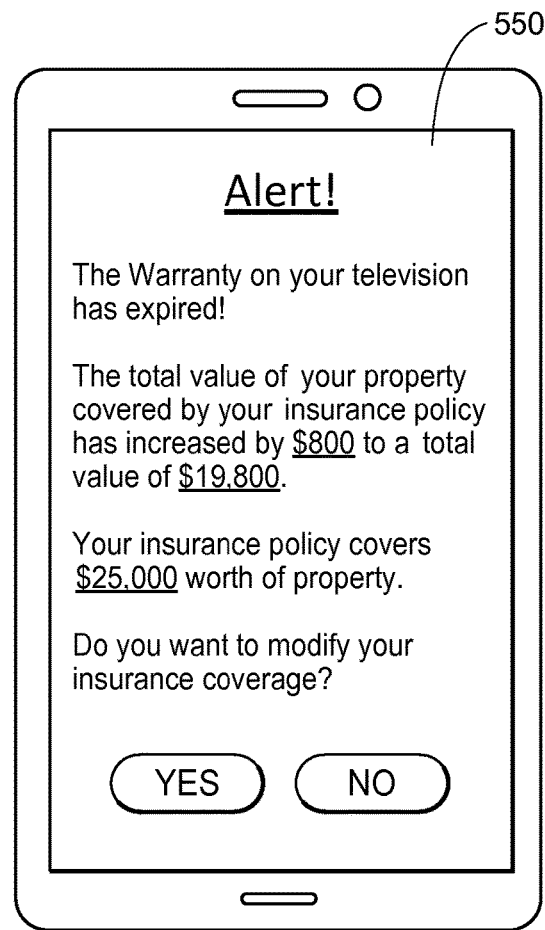
FIG. 5A  FIG. 5B

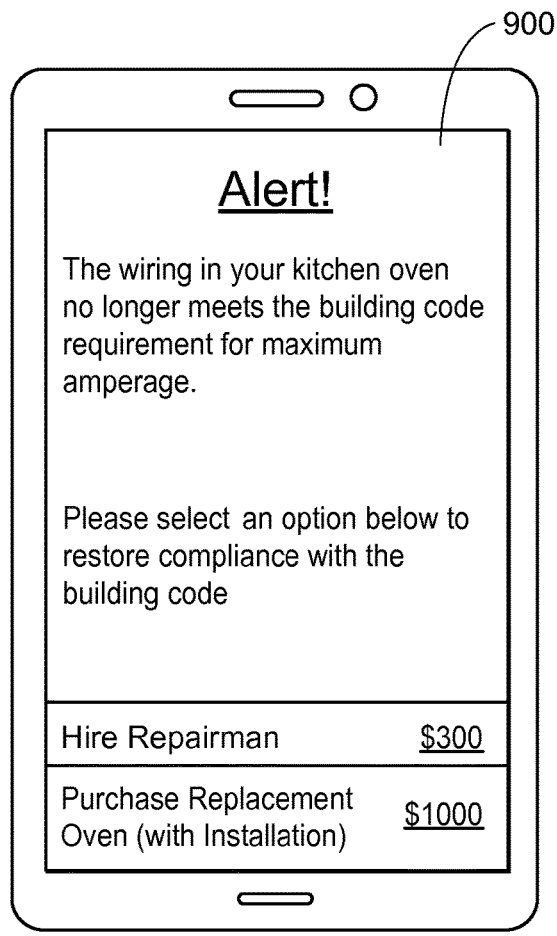
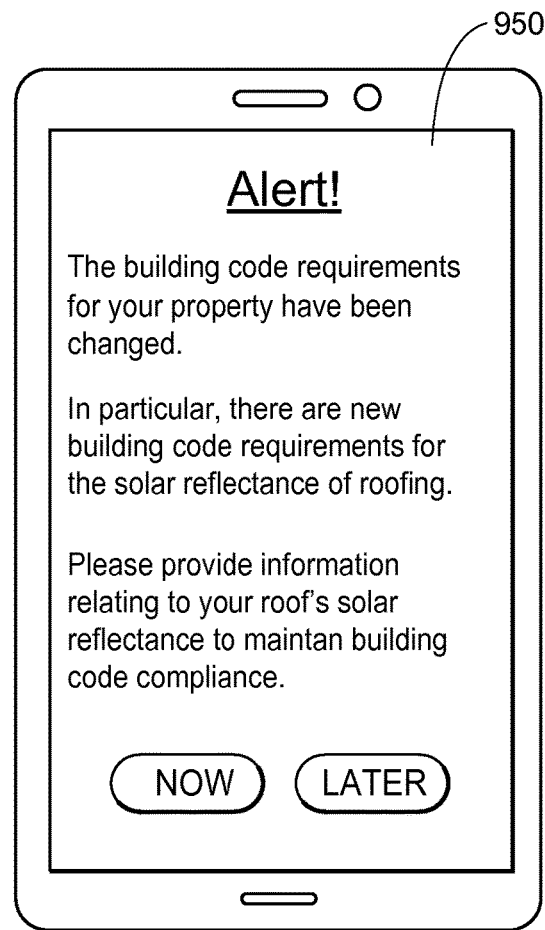
FIG. 9A  FIG. 9B

SYSTEMS AND METHODS FOR MANAGING BUILDING CODE COMPLIANCE FOR A PROPERTY

CROSS-REFERENCE TO RELATED APPLICATIONS

This application is a continuation of U.S. patent application Ser. No. 16/674,140 (filed Nov. 5, 2019, and entitled "SYSTEMS AND METHODS FOR MANAGING BUILDING CODE COMPLIANCE FOR A PROPERTY"), which is a continuation of U.S. patent application Ser. No. 14/873,817 (filed Oct. 2, 2015, and entitled "SYSTEMS AND METHODS FOR MANAGING BUILDING CODE COMPLIANCE FOR A PROPERTY"), now U.S. Pat. No. 10,515,372, which claims benefit of the filing date of U.S. Provisional Patent Application Nos. 62/060,962 (filed Oct. 7, 2014, and entitled "SYSTEMS AND METHODS FOR MANAGING DEVICES WITHIN A CONNECTED PROPERTY AND INSURANCE POLICIES ASSOCIATED THEREWITH"); 62/105,407 (filed Jan. 20, 2015, and entitled "SYSTEMS AND METHODS FOR MANAGING DEVICES WITHIN A CONNECTED PROPERTY AND INSURANCE POLICIES ASSOCIATED THEREWITH"); 62/187,624 (filed Jul. 1, 2015, and entitled "SYSTEMS AND METHODS FOR FACILITATING DEVICE REPLACEMENT WITHIN A CONNECTED PROPERTY"); 62/187,645 (filed Jul. 1, 2015, and entitled "SYSTEMS AND METHODS FOR MANAGING BUILDING CODE COMPLIANCE FOR A PROPERTY"); 62/187,651 (filed Jul. 1, 2015, and entitled "SYSTEMS AND METHODS FOR AUTOMATICALLY GENERATING AN ESCAPE ROUTE"); 62/187,642 (filed Jul. 1, 2015, and entitled "SYSTEMS AND METHODS FOR ANALYZING SENSOR DATA TO DETECT PROPERTY INTRUSION EVENTS"); 62/187,666 (filed Jul. 1, 2015, and entitled "SYSTEMS AND METHODS FOR IMPROVED ASSISTED OR INDEPENDENT LIVING ENVIRONMENTS"); 62/189,329 (filed Jul. 7, 2015, and entitled "SYSTEMS AND METHODS FOR MANAGING WARRANTY INFORMATION ASSOCIATED WITH DEVICES POPULATED WITHIN A PROPERTY"); 62/193,317 (filed Jul. 16, 2015, and entitled "SYSTEMS AND METHODS FOR MANAGING SMART DEVICES BASED UPON ELECTRICAL USAGE DATA"); 62/197,343 (filed Jul. 27, 2015, and entitled "SYSTEMS AND METHODS FOR CONTROLLING SMART DEVICES BASED UPON IMAGE DATA FROM IMAGE SENSORS"); 62/198,813 (filed Jul. 30, 2015, and entitled "SYSTEMS AND METHODS FOR MANAGING SERVICE LOG INFORMATION"); 62/200,375 (filed Aug. 3, 2015, and entitled "SYSTEMS AND METHODS FOR AUTOMATICALLY RESPONDING TO A FIRE"); 62/201,671 (filed Aug. 6, 2015, and entitled "SYSTEMS AND METHODS FOR AUTOMATICALLY MITIGATING RISK OF DAMAGE FROM BROKEN CIRCUITS"); 62/220,383 (filed Sep. 18, 2015, and entitled "METHODS AND SYSTEMS FOR RESPONDING TO A BROKEN CIRCUIT")—which are all hereby incorporated by reference in their entireties.

FIELD OF THE DISCLOSURE

The present disclosure generally relates to managing warranty information associated with devices within properties. More particularly, the present disclosure may relate to updating with warranty information inventory lists of smart devices within properties, and managing insurance policies associated therewith.

BACKGROUND

Homeowner and personal property insurance exists to provide financial protection against damage to the home, as well as personal property owned by the policyholder, respectively. With the proliferation of the "internet of things," more household devices and items are gaining communication and network connectivity capabilities. The new capabilities may enable data detection and more accurate information and metrics. However, current insurance policy processing systems may not account for the connected devices and/or improved information.

SUMMARY

The present embodiments may, inter alia, facilitate communications with connected devices and items, and/or facilitate insurance processing associated with the connected devices and items, among other functionalities. For instance, the present embodiments may dynamically manage insurance policies associated with a property (e.g., smart home) that may be populated with a plurality of devices. Each of the plurality of devices may be configured to monitor various conditions of the property (including those that affect building code compliance) and may have an associated warranty policy. A controller may interface with the plurality of devices to receive and monitor sensor data from the plurality of devices, as well as determine that the plurality of devices comply with relevant warranties and building code requirements. The controller may also propose a corrective action in the event any of the devices are non-compliant with a warranty or building code requirement. A customer may receive the proposed corrective action and/or may be able to accept, reject, or modify the proposed actions accordingly. The controller and/or an insurance provider may facilitate the action with the customer so that the customer may be afforded an effective and efficient channel for ensuring device compliance with warranty and/or building code requirements without having to manually monitor compliance.

In one aspect, a computer-implemented method of managing an insurance policy associated with a property may be provided. The property may be populated with a hardware controller in communication with a plurality of devices and each of the plurality of devices may be configured to monitor various conditions associated with the property. The method may include (1) receiving, by the hardware controller via a first communication network, building code compliance information associated with at least a portion of the plurality of devices; (2) updating, using the building code compliance information, an inventory list associated with the property, the inventory list including the plurality of devices and/or a set of building code requirements respectively associated with the plurality of devices; (3) comparing, by one or more processors, the building code compliance information to the respective set of building code requirements for each of the plurality of devices; (4) determining, by the one or more processors, that at least one of the plurality of devices does not comply with the set of building code requirements; and/or (5) transmitting, to a customer having the insurance policy via a second communication network, a notification that identifies the at least one of the plurality of devices that does not comply with the set of building code requirements to facilitate or prompt compliance with building codes. The method may include additional, less, or alternate actions, including those discussed elsewhere herein.

In one aspect, a system for managing an insurance policy associated with a property may be provided. The property may be populated with a hardware controller in communication with the plurality of devices and each of the plurality of devices may be configured to monitor various conditions associated with the property. The system may include (i) a communication module adapted to communicate data; (ii) a memory adapted to store non-transitory computer executable instructions; and/or (iii) one or more processors adapted to interface with the communication module. The one or more processors may be configured to execute the non-transitory computer executable instructions to cause the system to (1) receive, via the communication module, building code compliance information associated with at least a portion of the plurality of devices; (2) update, using the building code compliance information, an inventory list associated with the property, the inventory list including the plurality of devices and/or a set of building code requirements respectively associated with the plurality of devices; (3) compare, by the one or more processors, the building code compliance information to the respective set of building code requirements for each of the plurality of devices; (4) determine, by the one or more processors, that at least one of the plurality of devices does not comply with the set of building code requirements; and/or (5) transmit, via the communication module, a notification that identifies the at least one of the plurality of devices that does not comply with the set of building code requirements to facilitate or prompt compliance with building codes. The system may include additional, less, or alternate actions, including those discussed elsewhere herein.

In one aspect, a non-transitory computer-readable storage medium storing processor-executable instructions may be provided. When executed, the instructions may cause one or more processors to (1) receive, by the one or more processors via a local communication network, building code compliance information associated with at least a portion of the plurality of devices; (2) update, using the building code compliance information, an inventory list associated with the property, the inventory list including the plurality of devices and/or a set of building code requirements respectively associated with the plurality of devices; (3) compare, by the one or more processors, the building code compliance information to the respective set of building code requirements for each of the plurality of devices; (4) determine, by the one or more processors, that at least one of the plurality of devices does not comply with the set of building code requirements; and/or (5) transmit, to a customer having the insurance policy via a remote communication network, a notification that identifies the at least one of the plurality of devices that does not comply with the set of building code requirements to facilitate or otherwise prompt compliance with building codes. The instructions may cause additional, less, or alternate actions, including those discussed elsewhere herein.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

FIGS. 5A and 5B depict exemplary interfaces associated with alerting a customer to the status of warranties corresponding to their devices, in accordance with some embodiments;

FIGS. 9A and 9B depict exemplary interfaces associated with alerting a customer to the status of building code compliance corresponding to their devices, in accordance with some embodiments;

DETAILED DESCRIPTION

Figure 1:
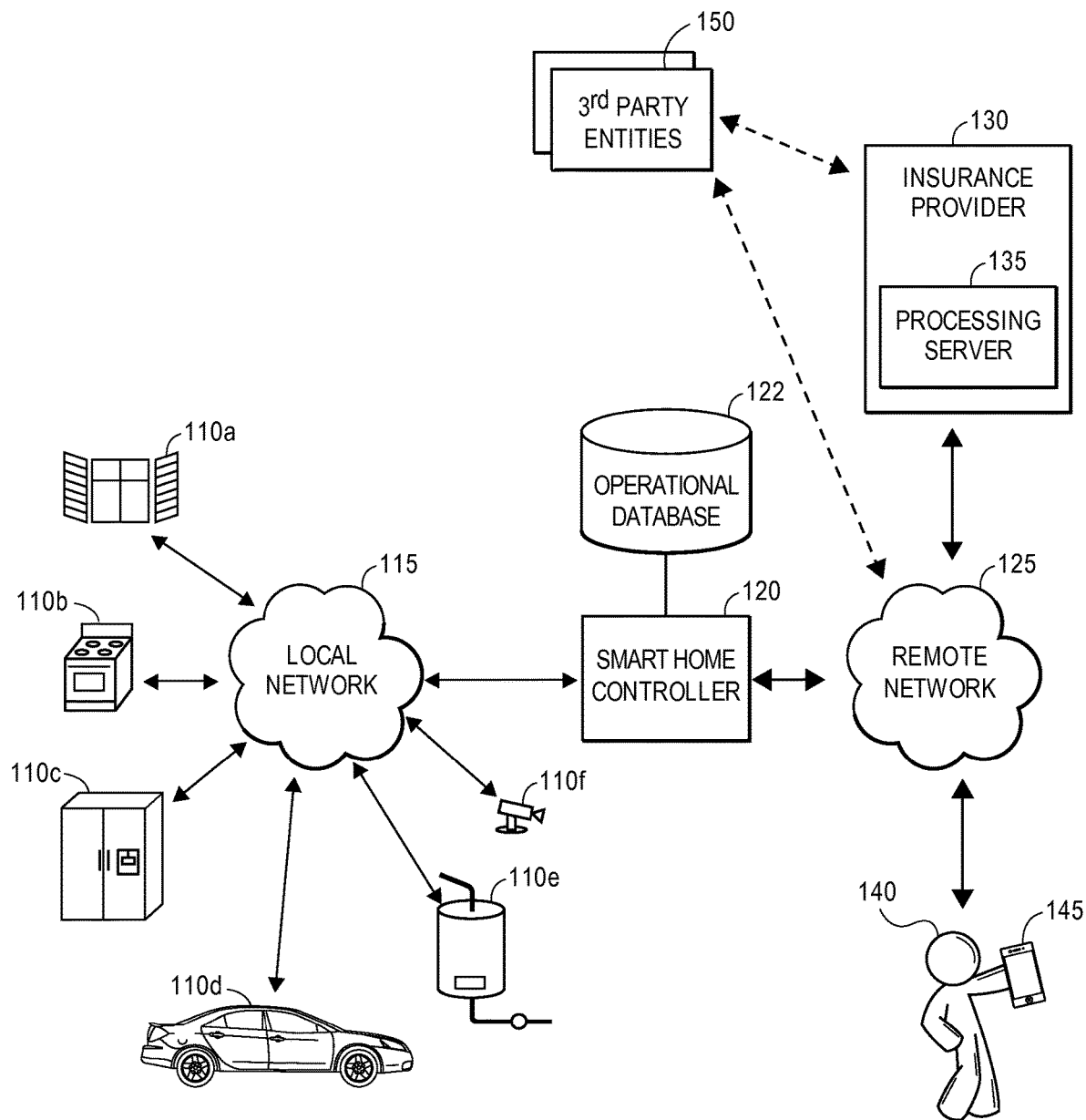
FIG. 1 depicts an exemplary environment including components and entities associated with retrieving and compiling device data and facilitating insurance processing associated therewith, in accordance with some embodiments.

The present embodiments may relate to, inter alia, managing insurance processing related to personal property within a home or other type of property, such as household furniture, appliances, electronics, vehicles (e.g., cars, boats, motorcycles), and/or other personal belongings (e.g., clothing, jewelry, antiques). The personal property, which may include structural components of the property itself, may be covered by warranty and/or implicate building code requirements. The present embodiments may also relate to (a) providing and updating insurance policies; (b) the maintaining and monitoring of warranty information and/or building code compliance; (c) the facilitation of corrective actions to warranty coverage and/or building code compliance; (d) modifying insurance policies; (e) updating and estimating the total worth of personal property once a warranty expires or a building code non-compliance is discovered, and/or (f) other insurance-related activities.

In one aspect, a property may have a "smart" central controller that may be wirelessly connected, or connected via hard-wire, with various household related items, devices, and/or sensors. The central controller may be associated with any type of property, such as homes, office buildings, restaurants, farms, and/or other types of properties. The central controller may be in wireless or wired communication with various "smart" items or devices, such as smart appliances (e.g., clothes washer, dryer, dish washer, refrigerator, etc.); smart heating devices (e.g., furnace, space heater, etc.); smart cooling devices (e.g., air conditioning units, fans, ceiling fans, etc.); smart plumbing fixtures (e.g., toilets, showers, water heaters, piping, interior and yard sprinklers, etc.); smart cooking devices (e.g., stoves, ovens, grills, microwaves, etc.); smart wiring, lighting, and lamps; smart personal vehicles; smart thermostats; smart windows, doors, or garage doors; smart window blinds or shutters; and/or other smart devices and/or sensors capable of wireless or wired communication. Each smart device (and/or sensor associated therewith), as well as the central controller, may be equipped with a processor, memory unit, software applications, wireless transceivers, local power supply, various types of sensors, and/or other components.

The smart devices may be included on an electronic or other inventory list associated with the property. The inventory list may include warranty information, if applicable, and/or any relevant building code requirement information for the smart devices included in the inventory list. In some embodiments, the warranty may correspond to a warranty that expires after a fixed interval or if a particular action is performed to the corresponding smart device. Additionally, in some embodiments, the building code requirement information may include minimum performance requirements for certain categories of smart devices. The warranty information and/or building code requirement information may be manually entered by a user or automatically determined based upon various factors. In some embodiments, the smart devices themselves may store and/or monitor the warranty information and/or building code requirement information, such as in a data tag or other type of storage or memory unit.

In particular, according to some embodiments, the warranty information may include an expiration date of the warranty, a purchase date of the warranty, an amount of coverage provided by the warranty, and/or a company providing the warranty. The central controller may include in the inventory list an additional data entry and/or column corresponding to each different type and/or category of warranty information.

Additionally, in some embodiments, the central controller may receive a set of building code requirements from an insurance provider and/or other $3^{rd}$ party entities (such as an entity that converts printed building code requirements into an electronic format that may be interpreted by electronic systems). Subsequently, the central controller may analyze the building code requirements to determine whether each requirement applies to each device included in the inventory list. If a building code requirement is applicable to a particular device, a data record in the inventory list may be modified to track compliance with the applicable building code requirement. In particular, the central controller may include in the inventory list an additional data entry and/or column corresponding to each applicable building code requirement.

The central controller may remotely gather data from the smart devices (or sensors associated therewith) dispersed around or otherwise interconnected within the property. The central controller may analyze the data and automatically determine that a warranty for a device is about to expire and/or that a warranty for a device has been voided by a particular action. Additionally, the central controller may analyze the data and automatically determine that a device does not comply with a building code requirement. In particular, the building code compliance information may include operational status (e.g., a current pressure, current reading, temperature, etc.) and/or device descriptors (e.g., a material the device is made from, a thickness of wiring, a diameter of piping, etc.) that is compared to the building code requirement. After analyzing the data, the central controller may determine a corrective action to remedy the warranty expiration and/or building code non-compliance. As generally used herein, the term "corrective action" means an action that causes a device (or a replacement device thereof) to be covered by a warranty and/or comply with a building code requirement. The central controller may transmit several possible corrective actions to the user for selecting a preferred course of action.

The systems and methods discussed herein address a challenge that is particular to insurance processing. In particular, the challenge relates to a difficulty in assessing or identifying connected components or devices that may be included in a property insurance policy, and determining whether they are covered by warranties and/or compliant with building code requirements. This is particularly apparent when certain components are not detected by a policyholder or disclosed to an insurance provider. The resulting property insurance policy, therefore, is often inaccurate. In conventional circumstances, the policyholder or an agent of the insurance provider is required to manually record the components and any corresponding information relevant to the insurance provider in an attempt to compile an accurate listing of components. As a result, these components may stop complying with building code requirements and/or lose warranty coverage without the policyholder and/or insurance provider ever finding out. In contrast, the systems and methods of the present embodiments may dynamically detect the presence of components, as well as the corresponding warranty and/or building code compliance information to ensure that the status of these components is known by the relevant parties, as well as to more accurately price insurance policies associated therewith. Therefore, because the present systems and methods employ dynamic detection of connected devices and components within a property, the present systems and methods are necessarily rooted in computer technology in order to overcome the noted shortcomings that specifically arise in the realm of insurance processing.

Similarly, the systems and methods of the present embodiments provide improvements in a technical field, namely, home automation. Instead of the systems and methods merely being performed by hardware components using basic functions, the systems and methods employ complex steps that go beyond the mere concept of simply retrieving and combining data using a computer. In particular, the hardware components detect connected devices, update an inventory list including the connected device, assess the worth of the connected devices based upon communicated warranty and/or building code compliance data, dynamically modify an insurance policy associated with the connected devices, determine corrective actions, and/or facilitate an performances of the corrective action, among other functionalities. This combination of elements impose meaningful limits in that the operations are applied to improve home automation by ensuring that connected devices are included in an insurance policy and/or that the insurance policy accurately reflects the amount of liability associated with the connected devices, and by facilitating and/or enabling the modification of insurance policies in a meaningful and effective way.

Generally, the information gathered by the central controller from the various smart devices and/or sensors disbursed around the property may be utilized for insurance purposes. The information may be used to process or manage insurance covering the home, residence or apartment, personal belongings, vehicles, etc. The systems and methods therefore offer a benefit to customers by automatically alerting the customer about warranty expirations and/or building code non-compliances, and/or determining and/or presenting (or performing or directing) corrective actions that remedy the situation. These features reduce the need for customers to manually assess property value and/or manually track, and/or maintain warranty and/or building code compliance. Further, as a result of the automatic monitoring of warranty and building code compliance information, insurance providers may experience a reduction in the amount of processing and modifications necessary to process the claims associated therewith. Moreover, by implementing the systems and methods, insurance providers may stand out as a cost-effective insurance provider, thereby retaining existing customers and attracting new customers. It should be appreciated that further benefits to the systems and methods are envisioned.

I. Exemplary Environment and Components for Managing Insurance Policies

FIG. 1 depicts an exemplary environment 100 including components and entities for managing devices associated with a property and processing insurance policies associated therewith. Although FIG. 1 depicts certain entities, components, and devices, it should be appreciated that additional or alternate entities and components are envisioned.

As illustrated in FIG. 1, the environment 100 may include a plurality of smart devices 110 that may be each connected to a local communication network 115. As shown in FIG. 1, the plurality of smart devices 110 may include smart window shutters 110a, a smart oven 110b, a smart refrigerator 110c, a smart vehicle 110d, a smart water supply 110e, and/or a smart surveillance camera 110f. Each of the plurality of devices 110 may be located within or proximate to the property (generally, "on premises"). Although FIG. 1 depicts six smart devices in the environment 100, it should be appreciated that additional or fewer smart devices may be present in other embodiments.

In some cases, the smart devices may be purchased from the manufacturer with the "smart" functionally incorporated therein. In other cases, the smart devices may have been purchased as "dumb" devices and subsequently modified to add the "smart" functionality to the device. For example, a homeowner may install a motor system on window shutters that is capable of transmitting the open/close status of the shutters and/or remotely receiving instructions to open or close the shutters. As another example, when a vehicle owner enrolls in a usage-based vehicle insurance policy, the vehicle owner may be provided a smart device that is able to monitor the miles driven by the vehicle and, upon returning to the home, the smart device may communicate the number of miles driven since previously departing.

The plurality of devices 110 may be configured to communicate with a controller 120 via the local communication network 115. The local communication network 115 may facilitate any type of data communication between devices and controllers located on the premises of the property via any standard or technology (e.g., LAN, WLAN, any IEEE 802 standard including Ethernet, and/or others). The local communication network 115 may further support various short-range communication protocols such as Bluetooth®, Bluetooth® Low Energy, near field communication (NFC), radio-frequency identification (RFID), and/or other types of short-range protocols.

According to aspects, the plurality of devices 110 may transmit, to the controller 120 via the local communication network 115, operational data, including warranty and/or building code compliance data, gathered from sensors associated with the plurality of devices 110. The operational data may be audio data, image or video data, status data, and/or other data or information. For example, the operational data may indicate that a person has voided a warranty by tampering with a seal; the current flow through a wiring component; the amount of water flowing through a pipe; and/or other information pertinent to an operation state or status of the plurality of devices 110. The operational data may include a timestamp representing the time that the operational data was recorded.

In some cases, the plurality of devices 110 may transmit, to the controller 120, various data and information associated with the plurality of devices 110. In particular, the data and information may include various costs and prices associated with the plurality of devices 110. For example, a washing machine may include a component, such as a data tag, that stores a retail price of the washing machine, a replacement costs of various parts of (or the entirety of) the washing machine, a renewal cost for a warranty associated with the washing machine, and/or a cost of an extended warranty. Additionally, the data component may store building code requirements, such as a voltage requirement. The various data and information may be programmable and updatable by an individual manually and/or automatically by the controller 120.

The controller 120 may be coupled to a database 122 that stores various operational data and information associated with the plurality of devices 110. Although FIG. 1 depicts the database 122 as coupled to the controller 120, it is envisioned that the database 122 may be maintained in the "cloud" such that any element of the environment 100 capable of communicating over either the local network 115 or one or more other networks 125 may directly interact with the database 122. In some embodiments, the database 122 organizes the operational data according to which individual device 110 that the data may be associated. Further, the database 122 may maintain an inventory list that may include the plurality of devices 110, as well as various data and information associated with the plurality of devices 110 (e.g., warranty information, building code compliance information, etc.).

The controller 120 may be configured to communicate with other components and entities, such as an insurance provider 130 and/or the 3$^{rd}$ party entities 150 via the network(s) 125. According to embodiments, the network(s) 125 may facilitate any data communication between the controller 120 located on the property and entities or individuals remote to the property via any standard or technology (e.g., GSM, CDMA, TDMA, WCDMA, LTE, EDGE, OFDM, GPRS, EV-DO, UWB, IEEE 802 including Ethernet, WiMAX, and/or others). In some cases, both the local network 115 and the network 125(s) may utilize the same technology and/or be considered the same network.

Generally, the insurance provider 130 may be any individual, group of individuals, company, corporation, or other type of entity that may issue insurance policies for customers, such as a homeowners, renters, or personal articles insurance policy associated with the property and/or an insured. According to the present embodiments, the insurance provider 130 may include one or more processing server(s) 135 configured to facilitate the functionalities as discussed herein. Although FIG. 1 depicts the processing server 135 as a part of the insurance provider 130, it should be appreciated that the processing server 135 may be separate from (and connected to or accessible by) the insurance provider 130.

Further, although the present disclosure describes the systems and methods as being facilitated in part by the insurance provider 130, it should be appreciated that other non-insurance related entities may implement the systems and methods. For example, a general contractor may aggregate the building code compliance data across many properties to determine whether there are any common factors between properties manifesting similar failures to comply with building code requirements. This aggregated data may enable the general contractor to determine, for example, whether a particular team of contractors or brand of electrical components are more frequently associated with failures to comply with building code regulations, and, as a result, adjust their deployment and supply chain accordingly. Thus, it may not be necessary for the property to have an associated insurance policy for the property owners to enjoy the benefits of the systems and methods.

Generally, the controller 120 may be configured to facilitate various insurance-related processing associated with insurance policies for the property 105. In one aspect, the controller 120 may update a total value of the devices 110 and/or determine any corresponding adjustments to an insurance policy for the devices 110 based upon determining that a warranty has expired and/or that a device is not compliant with a building code requirement. In another aspect, the controller 120 may compare the total value of the devices to a maximum coverage associated with the property and/or devices 110 to determine whether the insured maintains an appropriate amount of insurance coverage. The controller 120 may communicate any generated or determined information to the insurance provider 130 (and vice-versa) via the network(s) 125 to facilitate the insurance-related processing.

The controller 120 may also be in communication, via the network(s) 125, with an electronic device 145 associated with an individual 140. In some embodiments, the individual 140 may have an insurance policy (e.g., a home insurance policy, a renter's insurance policy) for the property or a portion thereof, or may otherwise be associated with the property (e.g., the individual 140 may live in the property). The electronic device 145 may be a smartphone, a desktop computer, a laptop, a tablet, a phablet, a smart watch, smart glasses, smart contact lenses, wearable electronic device, or any other electronic or computing device. According to some embodiments, the controller 120 may transmit, via the network 125 to the electronic device 145, a warning that a warranty to corresponding to one of the devices 110 is about to expire and/or that one of the devices 110 no longer complies with a building code requirement.

The warning may cause the electronic device 145 to present an interface that enables the individual 140 to select a corrective action to perform. The electronic device 145 may transmit, via the network 125, an indication of the selected corrective action to the controller 120. The controller 120 may facilitate any processing of the selected corrective action with the processing server 135 of the insurance provider 130. In some implementations, the processing server 135 may facilitate the corrective action and processing directly with the customer 140. In some embodiments, the controller 120 may also transmit any modifications to the value of the devices 110 based upon detected data from the plurality of devices 110. In response, the homeowner 140 may modify or otherwise alter an insurance policy associated with the property, devices 110, and/or the individual 140. The exemplary environment may include additional, less, or alternate components.

Figure 2:
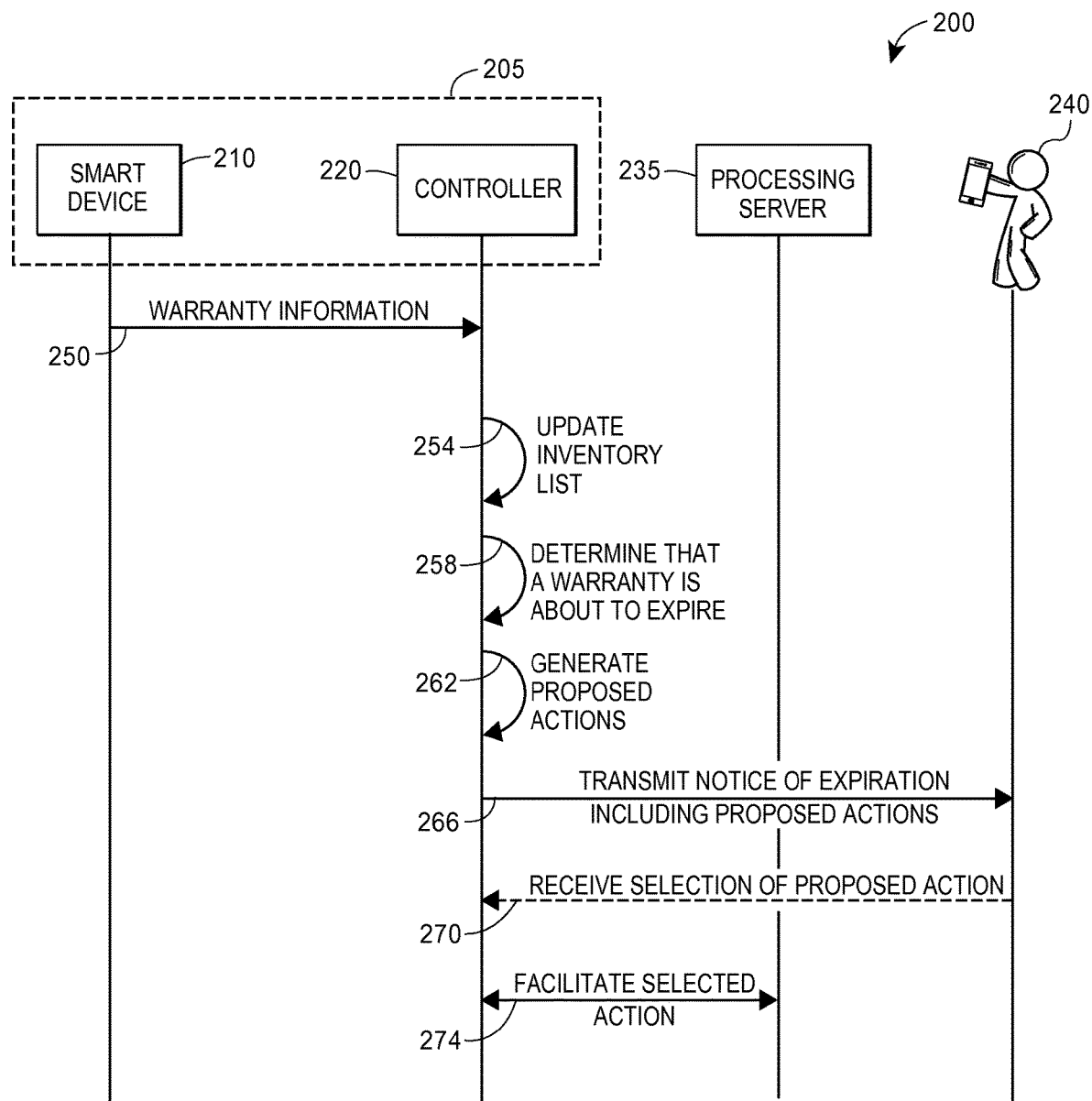
FIG. 2 depicts an exemplary signal diagram associated with determining that a warranty is about to expire and performing a corrective action, in accordance with some embodiments.

II. Exemplary Communication Flows for Modifying Insurance Policies Based Upon Warranty Expiration Referring to FIG. 2, illustrated is an exemplary signal diagram 200 associated with determining that a warranty is about to expire and performing a corrective action. In particular, FIG. 2 may include smart device 210 (such as one of the plurality of devices 110 as described with respect to FIG. 1), a controller 220 (such as the controller 120 as described with respect to FIG. 1 or a smart home controller), a processing server 235 (such as the processing server 135 as described with respect to FIG. 1 and/or other remote server) that may be associated with an insurance provider, and/or a customer 240 (such as the customer 140 as described with respect to FIG. 1).

The customer 240 may have an associated electronic device capable of communication with the other components, such as the electronic device 145 as described with respect to FIG. 1. Further, the customer 240 may be the policyholder for (or have access to) an insurance policy issued by the insurance provider and associated with the property 205. For example, the customer 240 may have a homeowners or personal articles insurance policy that covers damage or destruction to the smart device 210. It should be appreciated that the smart device 210 is populated on the premises of property 205.

The signal diagram 200 may begin when the smart device 210 provides (250) warranty information to the controller 220. The warranty information may include an expiration date and/or any other type of warranty information as described elsewhere herein. According to certain aspects, the smart device 210 may communicate the warranty information via a local network, such as via wireless communication and/or data transmission. In other aspects, a user may interface with the controller 220 to manually input the warranty information for the smart device 210. The controller 220 may access an inventory list associated with the property 205 and may update (254) the inventory list with the warranty information for the smart device 210.

In some aspects, the controller 220 may access and update an existing inventory list (e.g., by modifying a data record associated with the smart device 210). In some embodiments, the inventory list including the warranty information may be maintained separate from any other maintained inventory lists that monitor and/or track other information describing the smart devices included therein. In this regard, the inventory list may include an up-to-date listing of all smart devices within the property 205 and the corresponding warranty information therewith.

The controller 220 may then compare a current date to an expiration date in the stored warranty information associated with the smart device 210. If the current date is within a threshold timeframe of the expiration date, the controller 220 may determine (258) that the warranty covering the smart device 210 is about to expire. For example, a warranty for a laptop may expire on June $1^{st}$ of a given year. If the threshold timeframe is one month, on May $1^{st}$ of that year, the controller 220 may determine that the warranty for the laptop is about to expire. In some embodiments, the threshold timeframe may be automatically set by the controller 220 and/or manually set by the customer 240.

Once the controller 220 determines that the warranty corresponding to the smart device 210 is about to expire, the controller 220 may then generate (262) proposed corrective actions to ensure that the smart device 210 remains under warranty. One exemplary corrective action may include renewing the warranty with the manufacturer. For example, the stored warranty information associated with the smart device 210 may identify a company providing the warranty for the smart device 210. The controller 220 and/or the processing server 235 may be in communication with the identified company (such as wireless communication or data transmission via a communications network) to negotiate a cost and/or term for a renewal warranty. In this example, the purchase of the negotiated renewal warranty may be one proposed corrective action.

Another exemplary corrective action may be the purchase of an extended warranty from a company other than the provider of the soon to expire warranty. For example, an insurance provider associated with the processing server 235 may maintain relationships with a plurality of companies that provide extended warranties for different categories of products and/or devices. Based upon device identification information stored within the inventory list corresponding to the smart device 210, the controller 220 may categorize the smart device 210 as one such type of product and/or device. The controller 220 and/or the processing server 235 may negotiate with the company (such as via wireless communication or data transmission) associated with the determined category of products and/or devices to determine a cost and/or term for an extended warranty covering the smart device 210. For instance, the insurance provider and Company A may maintain a relationship in which the insurance provider refers expiring warranties covering washing machines to Company A. When the smart device 210 is a washing machine, Company A may offer a standard extended warranty for the particular model of the smart device 210. As a result, the controller 220 and/or the processing server 235 may be able to provide the standard extended warranty to the customer 240. Accordingly, in this example, the purchase of the extended warranty may be one proposed corrective action.

It should be appreciated that the controller 220 and/or the processing server 235 may be in communication with a plurality companies that provide extended warranties for the determined category of products and/or devices. Accordingly, the controller 220 and/or the processing server 235 may be able to provide extended warranties for each of the plurality of companies, such that the purchase of an extended warranty from each individual company is a separate proposed corrective action.

Still another exemplary corrective action may be the purchase of a replacement device, wherein the replacement device is covered by a warranty. For example, based upon device identification information stored within the inventory list corresponding to the smart device 210, the controller 220 may identify a particular manufacturer and/or model of the smart device 210. The insurance provider associated with the processing server 235 may maintain a relationship with the identified manufacturer to purchase new versions of the same model of the smart device 210 and/or a newer model of the smart device 210, wherein the purchased device is covered by a manufacturer's warranty. As a result, the controller 220 and/or processing server 235 may be able to offer the customer 240 a replacement device of the same or newer model for a negotiated price and covered by a warranty for a negotiated term. Accordingly, in this example, the purchase of the replacement device may be another proposed corrective action. It should be appreciated that additional and/or alternative proposed corrective actions are envisioned, including those discussed elsewhere herein.

After generating at least one proposed corrective action, the controller 220 may transmit (266) a notification to the electronic device associated with customer 240 informing the customer 240 that the warranty covering the smart device 210 is about to expire. Additionally, the notification may include at least one of the generated proposed corrective actions. It should be appreciate that the controller 240 may transmit several notifications at different times. For example, the controller may transmit a notification a month prior to the expiration of the warranty corresponding to the smart device 210. If a proposed corrective has not been received as of a week prior to the expiration of the warranty corresponding to the smart device 210, the controller 240 may transmit a second notification to the electronic device.

When the electronic device receives the transmitted notification, the electronic device may present an interface that details the proposed corrective actions and enables the customer 240 select one of the presented corrective actions. Upon receiving a selection of a particular corrective action, the electronic device may transmit to the controller 220 a notification identifying the selected corrective action.

Once the controller 220 receives (270) the notification identifying the selected corrective action, the controller 220 may automatically facilitate the performance of the selected corrective action with the processing server 235. For example, the controller 220 may facilitate the purchase of a proposed renewal warranty, extended warranty, and/or replacement device. When the selected corrective action is the purchase of a replacement device, and/or when the replacement device is received and installed on the premises of the property 205, the controller 220 may receive warranty information associated with the replacement device. As a result, the controller 220 may update the inventory list with the warranty information corresponding to the replacement device. If the replacement device is not included in the inventory list when the warranty information is received, the controller 220 may create a new data record in the inventory list corresponding to the replacement device.

Conversely, if the selected corrective action was purchasing a renewal or extended warranty, the controller 220 may update the data record corresponding to the smart device 210 to reflect the renewed and/or purchased warranty information. In some embodiments, the controller 220 may transmit a notification to the smart device 210 causing the smart device 210 to store the renewed and/or purchased warranty information to be stored in a data store therein. It should be appreciated that signal diagram 200 may include additional, fewer, and/or alternative actions, including those discussed elsewhere herein. For example, in some embodiments, some of the actions described with respect to the controller 220 may be alternatively performed by the processing server 235, and vice versa.

Figure 3:
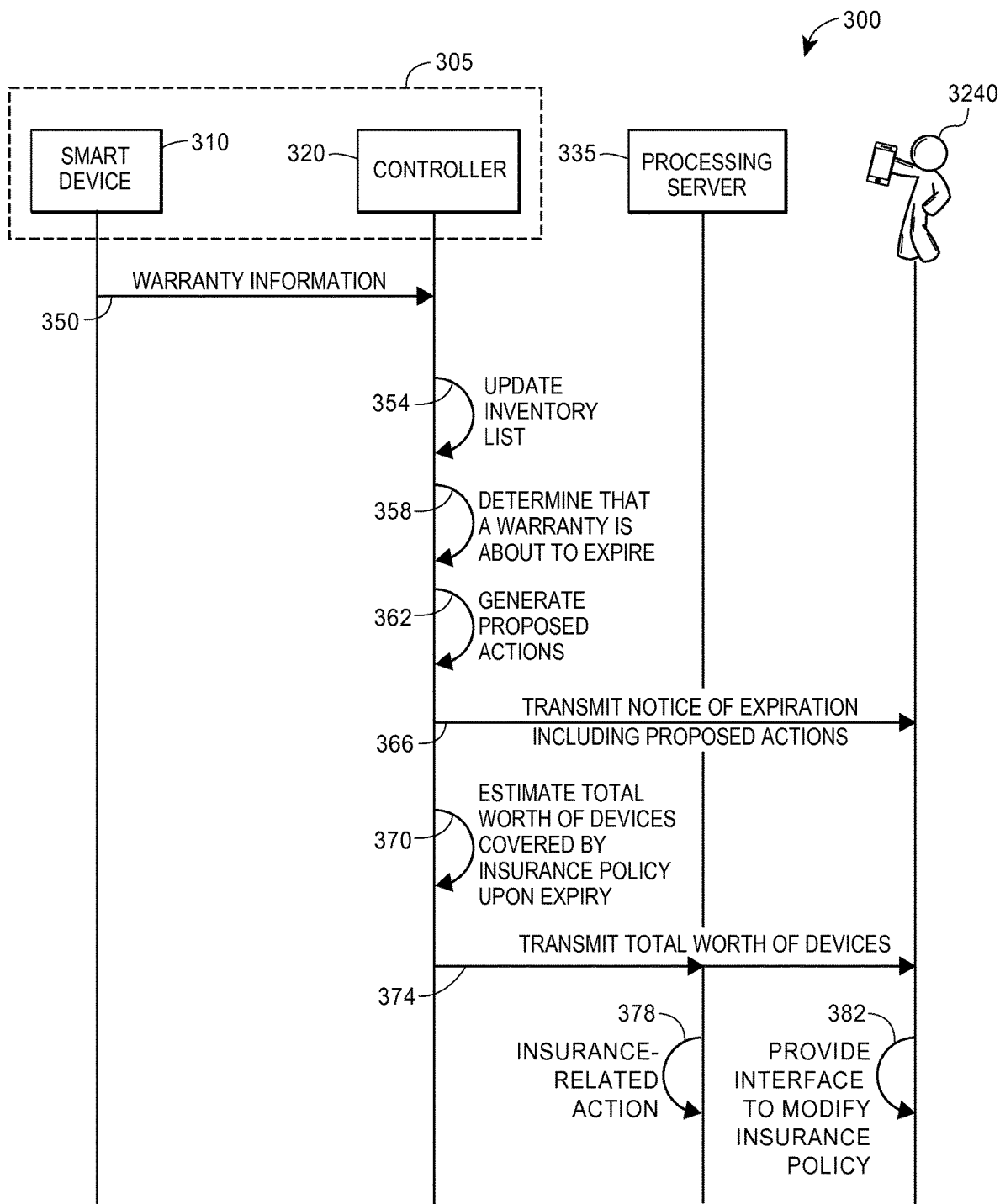
FIG. 3 depicts an exemplary signal diagram associated with determining that a warranty is about to expire and failing to receive a corrective action, in accordance with some embodiments.

Referring now to FIG. 3, illustrated is an exemplary signal diagram 300 associated with determining that a warranty is about to expire and failing to receive a corrective action from a customer 340 prior to the expiration of the warranty. In particular, FIG. 3 may include smart device 310 (such as one of the plurality of devices 110 as described with respect to FIG. 1), a controller 320 (such as the controller 120 as described with respect to FIG. 1 or a smart home controller), a processing server 335 (such as the processing server 135 as described with respect to FIG. 1 and/or other remote server) that may be associated with an insurance provider, and/or the customer 340 (such as the customer 140 as described with respect to FIG. 1).

The customer 340 may have an associated electronic device capable of communication with the other components, such as the electronic device 145 as described with respect to FIG. 1. Further, the customer 340 may be the policyholder for (or have access to) an insurance policy issued by the insurance provider and associated with the property 305. For example, the customer 340 may have a homeowners or personal articles insurance policy that covers damage or destruction to the smart device 310. It should be appreciated that the smart device 310 is populated on the premises of property 305.

The signal diagram 300 may begin when the smart device 310 provides (350) warranty information to the controller 320. As a result, the controller 320 may update (354) an inventory list with the warranty information; determine (358) that the warranty corresponding to smart device 310 is about to expire; generate (362) proposed corrective actions; and/or transmit (366) a notification to the customer 340 about the expiration of the warranty corresponding to the smart device 310, as well as the proposed corrective actions. It should be appreciated that the actions associated with steps 350-366 for the signal diagram 300 may be substantially similar to those described with respect to steps 250-266 for the signal diagram 200, as discussed above. However, unlike in signal diagram 200, the controller 320 does not receive a selection of a preferred corrective action from the customer 340 prior to the expiration of the warranty corresponding to the smart device 310.

Instead, after determining that the warranty corresponding to the smart device 310 has expired, the controller 320 may estimate (370) a total worth of all of devices on the premises of the property 305 the change in warranty coverage. For example, a television may have been purchased for $1,000 with a 1-year warranty that covered the full purchase price. When the warranty expires in one year, the television may be valued at $800. In this example, since the warranty provider may cover all damage to the television that occurs within the 1-year term, the value of the property covered by the insurance policy may not have increased upon purchasing the television due to the existence of the 1-year warranty. Reflecting the fact that the warranty provider no longer covers damage to the television, when the warranty corresponding to the television expires, the worth of the devices covered by the insurance policy may increase by the current value of the television, in this case $800. It should be appreciated that in some scenarios, the warranty may only cover certain forms of damage. Accordingly, upon the initial purchase, the worth of the devices covered by the insurance may increase by an amount inversely proportionate to the scope of the warranty. In these scenarios, the amount of worth for the device covered by the insurance policy may increase by an amount equal to the difference between the initial increase in worth and the current value of the television.

After the controller 320 calculates the total worth of the devices covered by the insurance policy upon the expiration of the warranty corresponding to the smart device 310, the controller 320 may also compare the total worth to a coverage limit associated with the insurance policy. In some scenarios, due to an increase in total worth, the total worth may exceed the coverage limit associated with the insurance policy. Subsequently, the controller 320 may transmit a notification including the total worth of the devices to the processing server 335 and/or the customer 340. According to some embodiments, the notification may also include an indication of the coverage limit associated with the insurance policy, as well as an indication if that coverage limit is exceeded.

Upon receiving the notification including the total worth of the devices, the processing server 335 may perform (378) an insurance-related action. For example, if the coverage limit associated with the insurance policy is exceeded, the processing server 335 may calculate a modification to the insurance policy to ensure full coverage for the devices. Conversely, if the total worth is significantly less than the coverage limit associated with the insurance policy, the processing server 335 may calculate a modification to the insurance policy that reduces the coverage limit to a more appropriate amount. In some scenarios, the processing server 335 may transmit the modification to the insurance policy to the customer 340 for approval. It should be appreciated that other insurance-related actions are envisioned.

Upon receiving the notification including the total worth of the devices, the electronic device associated with the customer 340 may provide (382) an interface that enables the customer 340 to modify the insurance policy. In some scenarios, the interface may enable the customer 340 to manually adjust parameters associated with the insurance policy (e.g., coverage limit). In some further scenarios, the interface may provide elements that enable the customer 340 to accept a modification determined by the processing server 335. It should be appreciated that signal diagram 300 may include additional, fewer, and/or alternative actions, including those discussed elsewhere herein. For example, in some embodiments, some of the actions described with respect to the controller 320 may be alternatively performed by the processing server 335, and vice versa.

Figure 4:
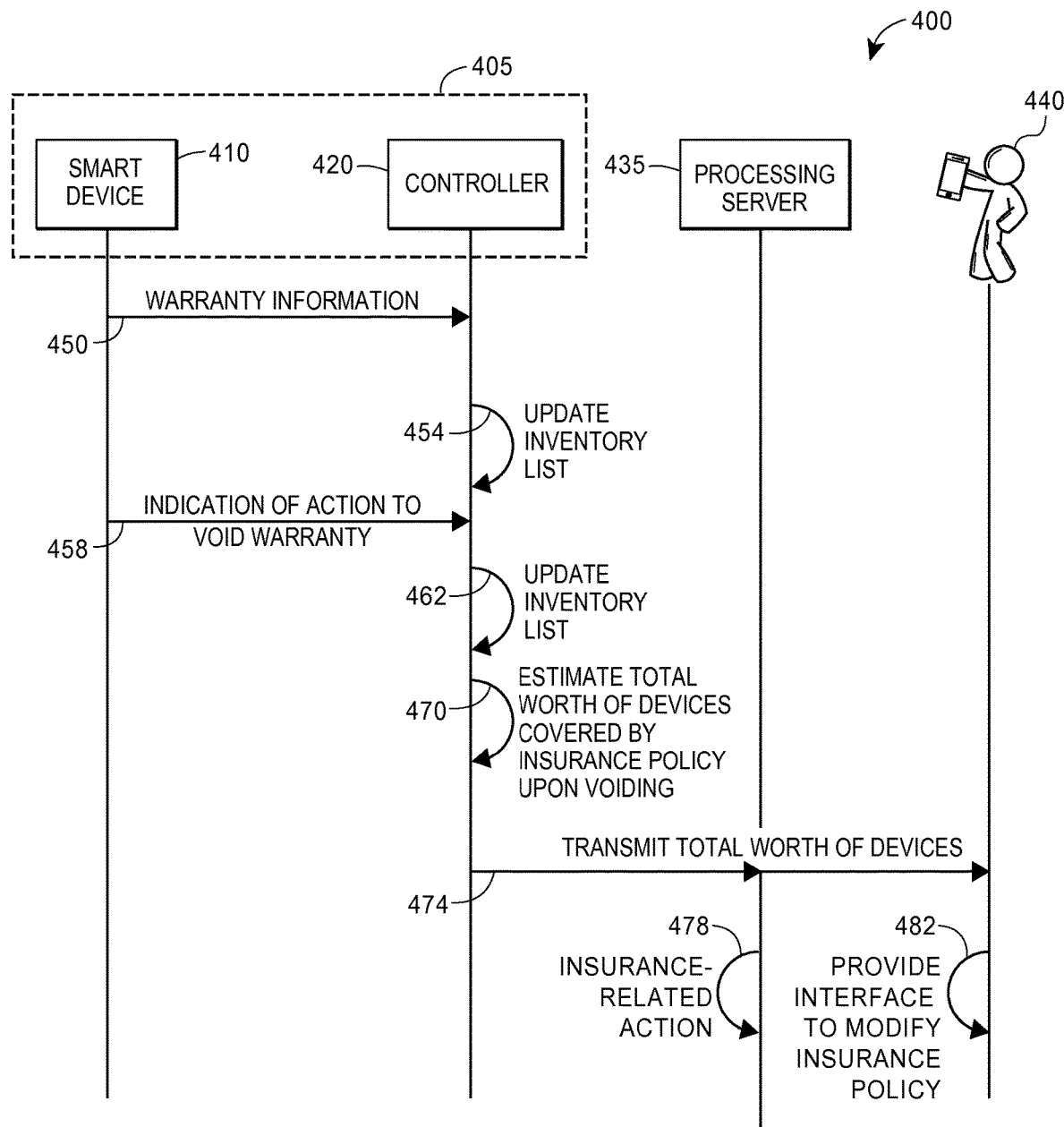
FIG. 4 depicts an exemplary signal diagram associated with determining that an individual associated with a property has performed an action to void a warranty, in accordance with some embodiments.

Referring now to FIG. 4, illustrated is an exemplary signal diagram 400 associated with determining that an individual associated with a property 405 performed an action to void a warranty corresponding to a smart device 410. In particular, FIG. 4 may include the smart device 410 (such as one of the plurality of devices 110 as described with respect to FIG. 1), a controller 420 (such as the controller 120 as described with respect to FIG. 1 or a smart home controller), a processing server 435 (such as the processing server 135 as described with respect to FIG. 1 and/or other remote server) that may be associated with an insurance provider, and/or a customer 440 (such as the customer 140 as described with respect to FIG. 1).

The customer 440 may have an associated electronic device capable of communication with the other components, such as the electronic device 145 as described with respect to FIG. 1. Further, the customer 340 may be the policyholder for (or have access to) an insurance policy issued by the insurance provider and associated with the property 405. For example, the customer 440 may have a homeowners or personal articles insurance policy that covers damage or destruction to the smart device 410. It should be appreciated that the smart device 410 is populated on the premises of property 405.

The signal diagram 400 may begin when the smart device 410 provides (450) warranty information to the controller 420 causing the controller 420 to update (454) an inventory list with the warranty information. It should be appreciated that the actions associated with steps 450 and 454 for the signal diagram 400 may be substantially similar to those described with respect to steps 250-266 for the signal diagram 200, as discussed above. However, prior to the threshold duration in which the controller 420 would determine that the warranty corresponding to the smart device 410 would expire, an individual associated with the property 405 performed an action to void the warranty. For example, the smart device 410 may include a tamperproof seal, in which breaking the seal voids the corresponding warranty. In this example, the smart device 410 may include a sensor that detects when the seal is breached. In response to detecting the action that voided the warranty, the smart device 410 may transmit (458) an indication to the controller 420 that indicates that the warranty corresponding to the smart device 410 has been voided.

After receiving the notification, the controller 420 may then update (462) the inventory list to indicate that the warranty to corresponding to the smart device 410 is now void. In particular, the controller 420 may update a data record in the inventory list associated with the smart device 410 to include a description of the action, a date the action occurred, a time the action occurred, visual data of the smart device 410 captured proximate to when the action occurred, and/or an identity of the individual associated with the property that performed the action. This data may be utilized by the controller 420 and/or processing server 435 to verify that the indicated action actually occurred and/or that it actually voided the warranty corresponding to the smart device 410. This verification provides a benefit to the customer 440 by reducing the potential impact a false positive transmitted by the smart device 410.

After verifying that the action to void the warranty corresponding to the smart device 410 occurred, the controller 420 may estimate (470) a total worth of all devices covered by the insurance policy upon the voiding of the warranty; and transmit (474) this total worth to the processing server 435 and/or the customer 440. As a result, the processing server 435 may perform (478) an insurance related activity and/or the electronic device associated with the customer 440 may provide (482) an interface to modify the insurance policy. It should be appreciated that the actions associated with steps 470-482 for the signal diagram 400 may be substantially similar to those described with respect to the steps 370-382 for the signal diagram 300, as discussed above. It should be further appreciated that signal diagram 400 may include additional, fewer, and/or alternative actions, including those discussed elsewhere herein. For example, in some embodiments, some of the actions described with respect to the controller 420 may be alternatively performed by the processing server 435, and vice versa.

III. Exemplary User Interfaces for Modifying Warranties

FIGS. 5A and 5B illustrate exemplary interfaces associated alerting a customer to the status of warranties corresponding to their devices. An electronic device (e.g., a smartphone or mobile device) may be configured to display the interfaces and receive selections and inputs via the interfaces. For example, a dedicated application associated with an insurance provider and that may be configured to operate on the electronic device may display the interfaces. It should be appreciated that the interfaces are merely examples and that alternative or additional content is envisioned.

FIG. 5A illustrates an interface 500 including details relating to an alert that a warranty for a device is about to expire. In particular, the interface 500 indicates a timeframe for when the warranty will expire ("1 month"). Further, the interface 500 may enable a user to select a corrective action to bring the device back under warranty. In particular, the interface 500 may enable the user to select from renewing the warranty with the manufacturer, purchasing an extended warranty from another warranty provider, and/or purchasing a replacement device. The interface 500 may further provide a cost associated with each corrective action.

FIG. 5B illustrates an interface 550 including details relating to an alert that a warranty for a device has expired. In particular, the interface 550 may indicate an amount that the total value of property covered by the insurance policy has changed ("$800"), a total value of property covered by the insurance policy ("$19,800), and/or a coverage limit corresponding to the insurance policy ("$25,000"). The interface 550 may enable the user to select whether to modify the insurance modification via a "YES" selection and a "NO" selection to dismiss the alert screen. The exemplary interfaces may include additional, less, or alternate functionality, including functionality described elsewhere herein.

IV. Exemplary Methods for Warranty Management

Figure 6:
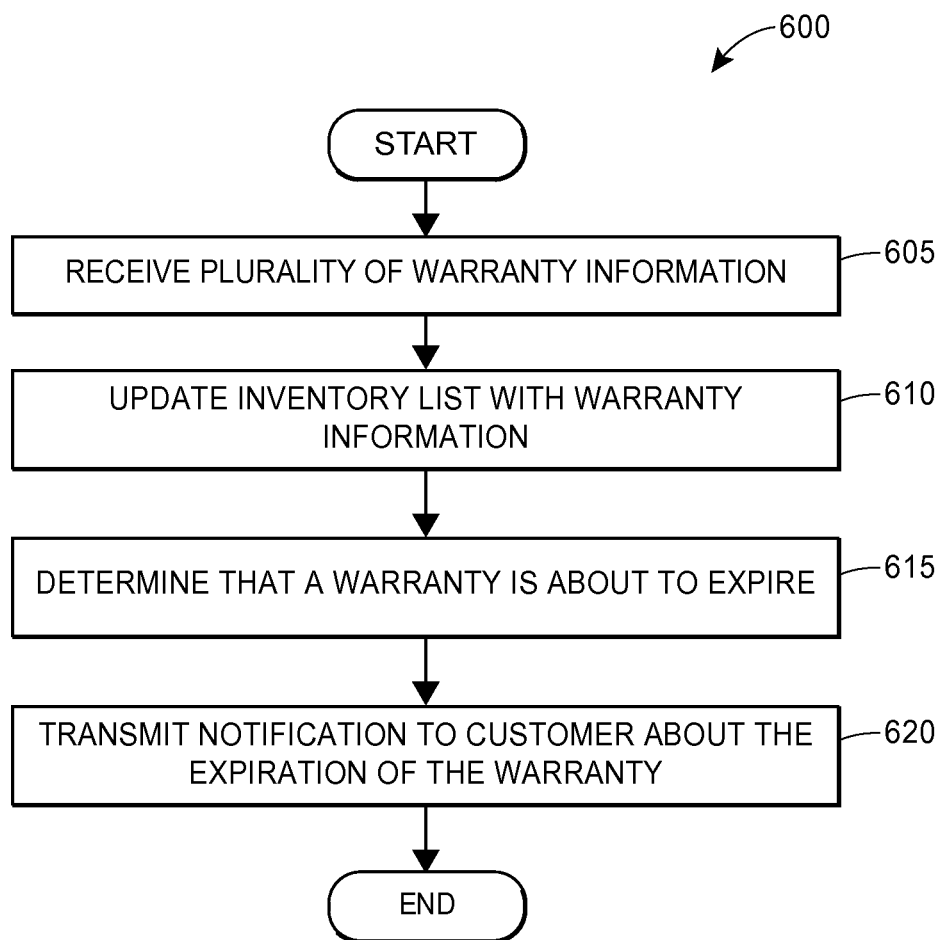
FIG. 6 depicts an exemplary flow diagram associated with managing warranty status, in accordance with some embodiments.

Referring to FIG. 6, depicted is a block diagram of an exemplary computer-implemented method 600 of managing warranty information for a plurality of devices, such as any of the smart devices 110 as described with respect to FIG. 1. The method 600 may be facilitated by an electronic device within the property, such as the controller 120, that may be in direct or indirect communication with an insurance provider (such as the insurance provider 130 or a remote processor or server thereof). In some implementations, the controller may store and maintain a digital inventory list of devices disposed on the property.

The method 600 may begin when the controller receives (block 605) warranty data from at least one device disposed within the property. The warranty data may be received from a device upon the device detecting a local network, periodically (e.g., once a month), or at any other time. Upon receiving the warranty data, the controller may determine an identity of the device that communicated the warranty data (e.g., by processing an identification code contained in the warranty data transmission). After determining the identity of the device corresponding to the warranty data, the controller may query the inventory list to access the respective device data. In some embodiments, if the inventory list does not contain warranty data corresponding to the respective device, or the stored warranty data is different than the received warranty data, the controller may update (block 610) the warranty information for the source device in the inventory list.

In some scenarios, the warranty information may contain information pertaining to the expiration of the respective warranty. For example, the warranty information may contain an exact date that the warranty expires. The controller may scan all of the warranty data maintained in the inventory list to determine (block 615) whether any warranties corresponding to devices in the inventory list are about to expire (or have expired). The scan may occur on a regular schedule (e.g., the first of each month), in response to a trigger event (e.g., adding a new device to the inventory list), or at any other time. As part of the scan, the controller may compare the current date to the expiration dates of the respective warranty data. If the two dates are within a certain threshold (e.g., three months, one month, etc.), the controller may determine that the respective warranty is about to expire.

The controller may transmit (block 620) a notification to an electronic device of an individual associated with the property indicating that a warranty is about to expire. In some scenarios, the indication includes an identity of the device corresponding to the warranty about to expire, the date the warranty expires, warranty policy information, and/or other information. The controller may store an identification of the electronic device. For example, the electronic device may be a mobile device, such as a smartphone, belonging to the owner and/or occupant of the property. In some scenarios, the controller may communicate the notification to the insurance provider.

In some implementations the controller may communicate with a vendor of the device to automatically purchase a replacement device, and/or a renewal or extended warranty. When the controller receives warranty information from the replacement device, the controller may store the corresponding information in the inventory list. Additionally, if the controller detects that the now out-of-warranty device is no longer communicating over the local network, the controller may remove the now out-of-warranty device from the inventory list. In some additional implementations, an insurance policy associated with the property and/or individual is adjusted based upon the expiration of a device warranty. It should be further appreciated that method 600 may include additional, fewer, and/or alternative actions, including those discussed elsewhere herein.

Figure 7:
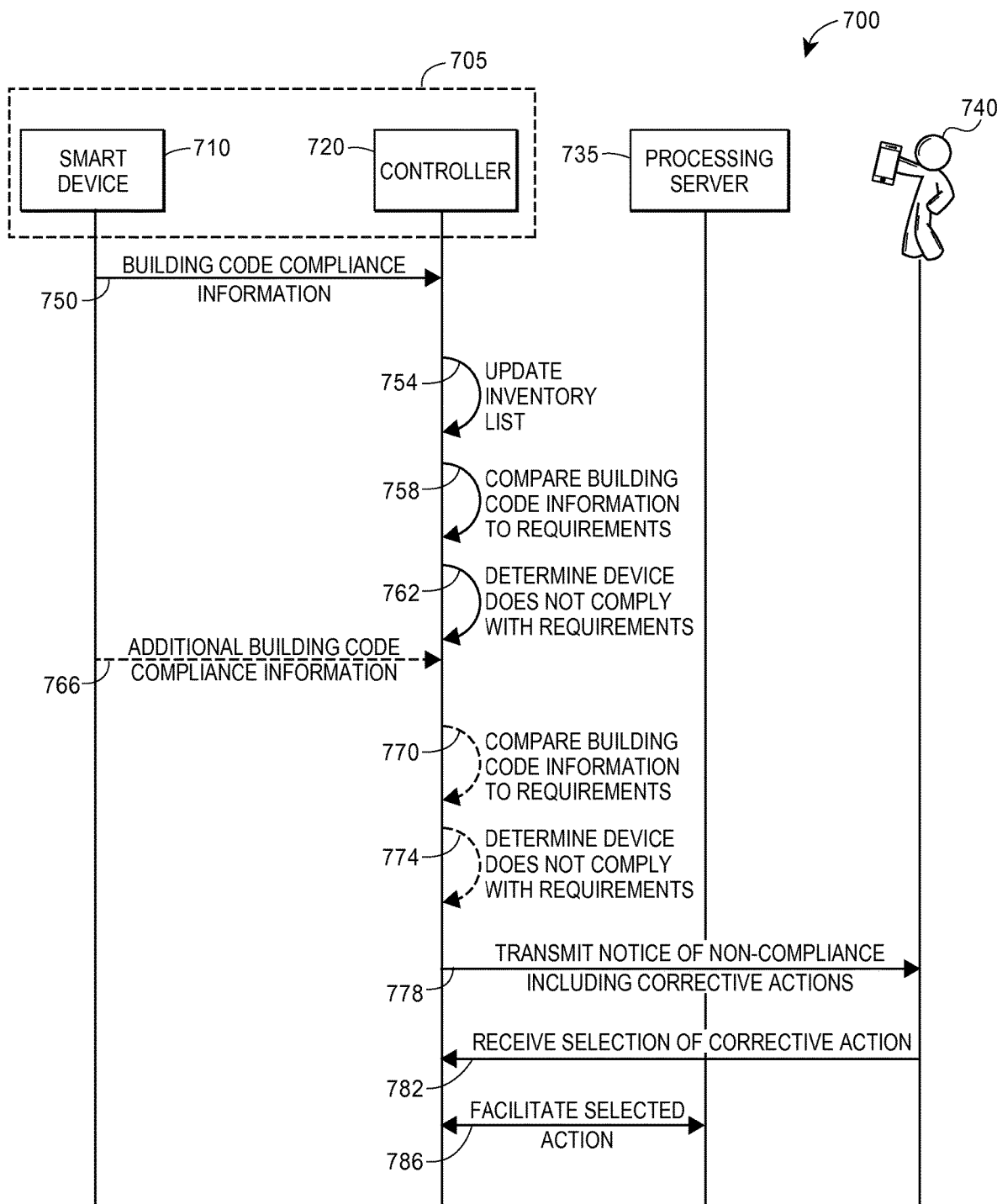
FIG. 7 depicts an exemplary signal diagram associated with determining that a smart device no longer complies with a building code requirement, in accordance with some embodiments.

V. Exemplary Communication Flows for Modifying Insurance Policies Based Upon Building Code Compliance Referring to FIG. 7, illustrated is an exemplary signal diagram 700 associated with determining that a smart device no longer complies with a building code requirement. In particular, FIG. 7 may include smart device 710 (such as one of the plurality of devices 110 as described with respect to FIG. 1), a controller 720 (such as the controller 120 as described with respect to FIG. 1 or a smart home controller), a processing server 735 (such as the processing server 135 as described with respect to FIG. 1 and/or other remote server) that may be associated with an insurance provider, and/or a customer 740 (such as the customer 140 as described with respect to FIG. 1).

The customer 740 may have an associated electronic device capable of communication with the other components, such as the electronic device 745 as described with respect to FIG. 1. Further, the customer 740 may be the policyholder for (or have access to) an insurance policy issued by the insurance provider and associated with the property 205. For example, the customer 740 may have a homeowners or personal articles insurance policy that covers damage or destruction to the smart device 710. It should be appreciated that the smart device 710 is populated on the premises of property 705.

The signal diagram 700 may begin when the smart device 710 provides (750) building code compliance information to the controller 720. The building code compliance information may include a measurement of an operational parameter that describes the performance of the smart device 710. In some embodiments, the building code compliance information corresponds to a building code requirement applicable to the smart device 710. According to certain aspects, the smart device 710 may communicate the building code compliance information via a local network. In other aspects, a user may interface with the controller 720 to manually input the building code compliance information for the smart device 710. The controller 720 may access an inventory list associated with the property 705 and may update (754) the inventory list with the building code compliance information for the smart device 710. In some aspects, the controller 720 may access and update an existing inventory list (e.g., by modifying a data record associated with the smart device 710). In some embodiments, the inventory list including the building code compliance information may be maintained separate from any other inventory lists that monitor and/or track other information describing the smart devices included therein. In this regard, the inventory list may include an up-to-date listing of all smart devices within the property 705 and the corresponding building code compliance information and/or building code requirements associated therewith.

The controller 720 may then compare (758) the building code compliance information to the building code requirements applicable to the smart device 710. In some embodiments, a building code requirement may be a minimum performance requirement such that the building code compliance information should indicate that the corresponding operational parameter exceeds the minimum performance requirement. For example, while in use, a showerhead may be required to maintain a minimum flow pressure of 8 psi. In this example, the smart device 710 may include the showerhead and a water pressure sensor measuring to the flow pressure through the showerhead. Similarly, instead of an upper or lower bound, some building code requirements may include a range of allowable values for a particular operational parameter.

Still further, in some embodiments, the building code requirement may relate to the material in which the smart device 710 is made. For example, cable boxes may be required to consist of a corrosive-resistant material. In this example, the smart device 710 may include the cable box and a smart tag capable of transmitting an indication of the material in which the cable box is made.

Based upon the comparison, the controller 720 may determine (762) that the smart device 710 does not comply with the building code requirements. For building code requirements that measure the performance of the smart device 710, this may mean determining that the building code compliance information indicates that an operational parameter falls outside the upper and/or lower bounds. Returning to the showerhead example, if the building code compliance information indicated that the showerhead is experiencing 6 psi of flow pressure, then the controller may determine that the showerhead is not compliant with the building code requirements.

In embodiments in which the building code requirement indicates a material requirement, the inventory list may maintain a list of known and/or commonly used materials that satisfy the building code requirement. Upon receiving the building code compliance information, the controller may compare a material indicated in the building code compliance information to the list of materials stored within the inventory list. If the material in the building code compliance information is not contained within the list of materials, then the controller 720 may determine that the smart device 710 does not comply with the building code requirement. Returning to the cable box example, the inventory list may contain a list of known and/or commonly-used materials that are corrosive-resistant (e.g., zinc, cadmium, and/or enamel). If the building code compliance information indicates that the cable box is made of iron, for example, then the controller may determine that the cable box does not comply with the building code requirement.

It should be appreciated that in some cases, detecting that a smart device does not comply with the building code requirements at a single moment in time may not accurately represent the performance of the smart device. For example, in the showerhead example, when the customer 740 first turns on the water flow to the shower, the flow pressure may briefly be less than 8 psi while the water first begins to flow to the showerhead. In such a scenario, it might be inappropriate to inform the customer 740 about the momentary non-compliance.

Accordingly, in some embodiments, the controller 720 may determine that the smart device 710 is operating at a non-compliant level for a threshold duration prior to notifying the customer 740. It should be appreciated that the threshold duration may vary based upon the type of device and/or the corresponding operational parameter. This provides a benefit to the customer 740 by reducing the number of false positives associated with determining non-compliance with the building code requirements. By reducing the number of inappropriate notifications, the customer 740 may gain more confidence in the disclosed systems resulting in a higher likelihood that the customer 740 decides to perform a corrective action.

In the embodiments in which the controller 720 detects that the non-compliant condition lasts for a threshold duration, upon the expiration of this threshold duration, the smart device 710 may provide (766) additional building code compliance information. In some embodiments, in order to reduce network traffic, the building code compliance information may only include an indication of the operational parameter that was previously determined to be non-compliant. Upon receiving the additional building code compliance information, the controller 720 may compare (770) the additional building code compliance information to the building code requirements. If the controller 720 determines (774) that the smart device 710 still does not comply with the building code requirement, then it may be appropriate to inform the customer 740 about the determined non-compliance.

Accordingly, the controller 720 may transmit (778) a notice of non-compliance to the customer 740. The notice may include an identification of the smart device 710, the building code requirement in which the smart device 710 does not comply, the received building code information, and/or other information describing the determined non-compliance. In some embodiments, the notification may cause the electronic device associated with the customer 740 to provide an interface that displays the transmitted information. The interface may also enable the customer 740 to perform a corrective action that resolves the non-compliant condition. For example, the interface may enable the customer 740 to select between hiring a professional to repair the smart device 710 and/or purchasing a replacement device for the smart device 710. In some embodiments, the interface may further display a cost associated with each corrective action. It should be appreciated that additional and/or alternative displayed corrective actions are envisioned, including those discussed elsewhere herein.

In some embodiments, the controller 720 may receive (782) from the customer 740 an indication of a selected corrective action. For example, the customer may have indicated, using the interface on the electronic device, a desire to hire a repairman. Upon receipt of the indication, the controller 720 may coordinate with the processing server 735 to facilitate (786) the performance of the selected action. In some implementations, the insurance provider associated with the processing server 735 may maintain a relationship with a plurality of repair companies that specialize in different types of products. When the selected action is to repair the smart device 710, the processing server 735 may determine a particular company that specializes in repairing the smart device 710. The controller 720 and/or processing server 735 may then transmit a repair request on behalf of the customer 740, such that the particular company will coordinate with the customer 740 to repair the smart device 710.

It should be appreciated, that in some embodiments the customer may never select a corrective action causing the non-compliant condition to persist. As a result, the controller 720 may calculate a modified insurance coverage quote based upon the smart device 710 not complying with the building code requirement. The controller 720 may transmit the modified insurance quote to the customer 740 for approval and/or to provide a warning about a potential change to an insurance policy. If the customer 740 still does not perform a corrective action for a threshold duration, the controller 720 may facilitate with the processing server 735 a modification to the insurance policy according to the modified insurance coverage quote. It should be further appreciated that signal diagram 700 may include additional, fewer, and/or alternative actions, including those discussed elsewhere herein. For example, in some embodiments, some of the actions described with respect to the controller 720 may be alternatively performed by the processing server 735, and vice versa.

Figure 8:
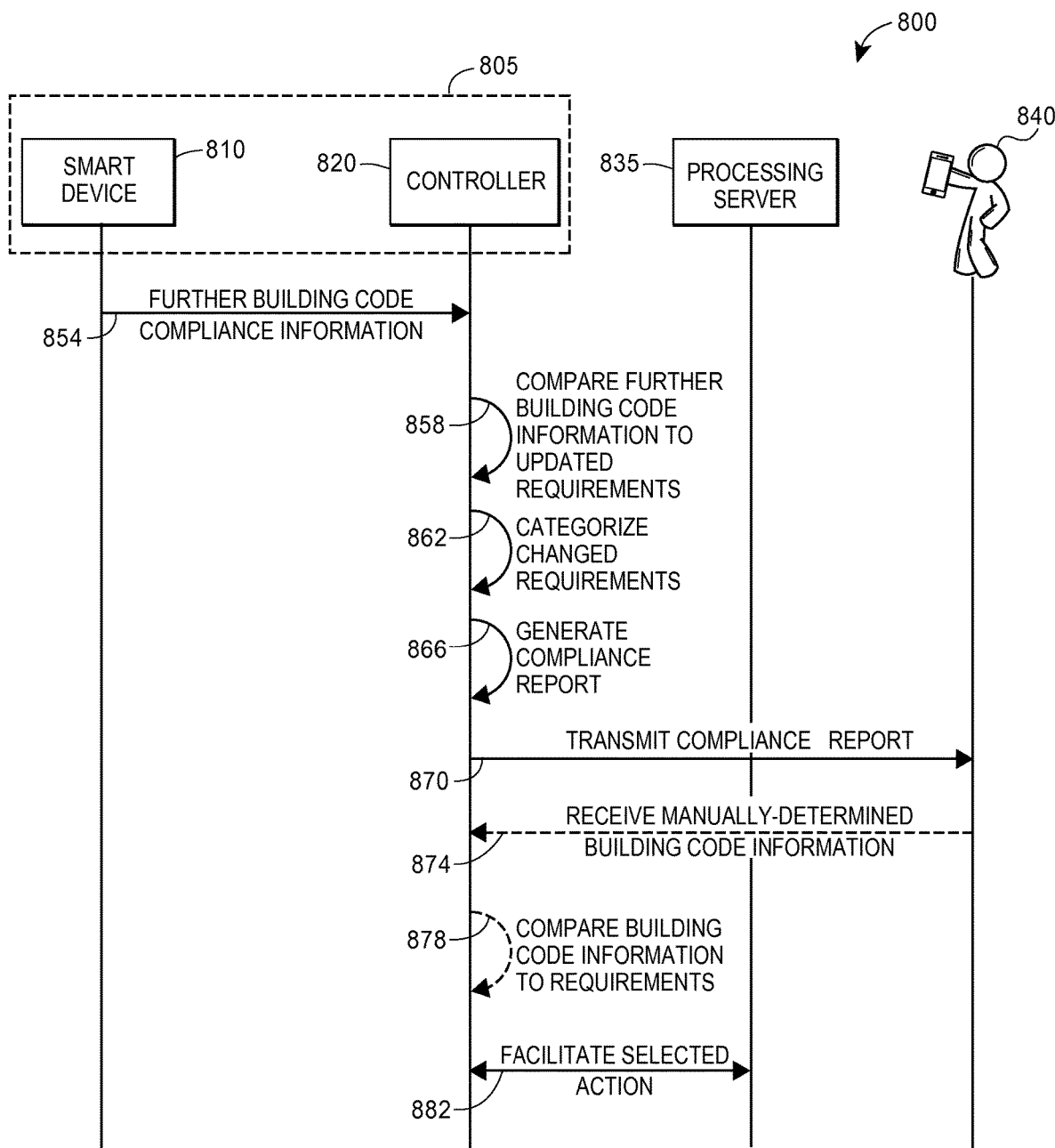
FIG. 8 depicts an exemplary signal diagram associated with receiving an update to a set of building code requirements, in accordance with some embodiments.

Referring now to FIG. 8, illustrated is an exemplary signal diagram 800 associated with receiving an update to a set of building code requirements associated with a property 805. In particular, FIG. 8 may include a plurality of smart devices 810 (such as the plurality of devices 110 as described with respect to FIG. 1) that are implicated by the updated building code requirements, a controller 820 (such as the controller 120 as described with respect to FIG. 1 or a smart home controller), a processing server 835 (such as the processing server 135 as described with respect to FIG. 1 and/or other remote server) that may be associated with an insurance provider, and/or a customer 840 (such as the customer 140 as described with respect to FIG. 1).

The customer 840 may have an associated electronic device capable of communication with the other components, such as the electronic device 145 as described with respect to FIG. 1. Further, the customer 840 may be the policyholder for (or have access to) an insurance policy issued by the insurance provider and associated with the property 805. For example, the customer 840 may have a homeowners or personal articles insurance policy that covers damage or destruction to the smart device 810. It should be appreciated that the smart devices 810 are populated on the premises of property 805.

The signal diagram 800 may begin when the controller 805 receives (850) updated building code requirements from the processing server 835 and/or any other $3^{rd}$ party that maintains building code requirements. In some embodiments, the updated building code requirements are provided in a format that is readily interpretable by the controller 820. For example, the processing server 835 may receive an update to the building code requirements from a governmental entity. The processing server 835 may then parse the updated building code requirements to convert them into an electronic format that compatible with the controller 820 and/or the inventory list stored therein.

Upon receiving the updated building code requirements, the controller 820 may compare the updated building code requirements to the stored building code requirements to create a set of changed building code requirements. It should be appreciated that in some embodiments, the processing server 835 may only transmit building code requirements that have changed. The controller 820 may then update the inventory list to replace outdated building code requirement information with the updated building code requirement information. In some embodiments, the inventory list may contain an indication of whether each included smart device is compliant with the stored building code requirements. If a changed building code requirement is applicable to a particular smart device, this indication for the particular smart device may be changed to a state indicating that compliance is yet to be determined.

In order to determine whether the property 805 still complies with all relevant building code requirements, the controller 820 may receive (854) further building code compliance information from the smart devices 810. To reduce network traffic, in some embodiments the smart devices 810 may only transmit further building code compliance information that corresponds to a changed building code requirement. According to certain aspects, the smart devices 810 may communicate the further building code compliance information via a local network. In other aspects, a user may interface with the controller 820 to manually input the further building code compliance information for the smart devices 810.

Upon receiving the further building code compliance information, the controller 820 may compare (862) the further building code compliance information to the corresponding changed building code requirements. The controller may determine whether each of the smart devices 810 complies with the changed building code requirements. The comparison may be substantially similar to the steps 758 and 762 of signal diagram 700 described with respect to FIG. 7.

According to certain aspects, the controller may then categorize (862) each of the changed building code requirements to indicate whether the property 805 complies with the requirement, whether the property 805 does not comply with the requirement, and/or the smart devices 810 are unable to communicate sufficient data to determine compliance with the requirement. In some embodiments, as the controller 820 determines whether each of the smart devices 810 complies with each changed building code requirements, the controller 820 may change the indication of whether the smart device is compliant with the building code requirements.

As an example, if an insulation requirement for a refrigerator has been updated, the controller 820 may compare insulation information from the smart refrigerator to the changed requirement. If the requirement is satisfied, the controller 820 may change the compliance indication to a state indicating compliance. Conversely, if the requirement is not satisfied, the controller 820 may change the compliance indication to a state indicating non-compliance.

After performing this analysis for each smart device and/or changed building code requirement, there may still be some changed building code requirements that the further building code compliance information did not contain sufficient data to verify. As a result, the compliance indication for these smart devices may remain in the indeterminate state. This may cause the inventory list to contain a set of smart devices recently changed to compliant, a set of smart devices recently changed to non-compliant, and/or a set of smart devices for which compliance is indeterminate.

Subsequently, the controller 820 may aggregate the categorized information into a compliance report. The compliance report may describe the building code requirements that have been changed, whether the smart device 810 complies with the changed building code requirements, any potential actions the customer 840 may perform to determine compliance for any requirements in which compliance could not be automatically determined, and/or other information relating to the changed building code requirements. The potential actions may include instructions on how the customer 840 may measure or otherwise determine compliance with the changed building code requirement, and/or how to hire an inspector to determine compliance. After generating the compliance report, the controller 820 may transmit (870) the compliance report to the electronic device associated with the customer 840 and/or the processing server 835.

In response, the controller 820 may receive any manually-determined building code compliance information. In some cases, the manually-determined building code compliance information may be input into the controller 820 via an interface; in other cases, the manually-determined building code compliance information may be entered into an interface on the electronic device associated with the customer 840. In scenarios in which the customer coordinated an inspector to determine compliance, the manually-determined building code compliance information may be received directly via the an electronic device associated with the inspector and/or indirectly via communication with the processing server 835 (i.e., the inspector communicated the manually-determined building code compliance information to the insurance provider associated with the processing server 835).

Upon receiving the manually-determined building code compliance information, the controller 820 may compare (878) the manually-determined building code compliance information to the changed building code requirements. As a result, the controller may then determine that all of the changed building code requirement that lacked sufficient data to determine compliance now comply with the changed building code requirements. As a result, the controller 820 may coordinate with the processing server 835 to facilitate (882) an insurance-related activity.

For example, the insurance provider may provide an incentive, such as a reduced insurance coverage quote and/or reward points, to encourage the determination of building code compliance as building code requirements change over time. The controller 820 may communicate an indication to the customer 840 of any facilitated insurance-related activity. It should be further appreciated that signal diagram 800 may include additional, fewer, and/or alternative actions, including those discussed elsewhere herein. For example, in some embodiments, some of the actions described with respect to the controller 820 may be alternatively performed by the processing server 835, and vice versa.

VI. EXEMPLARY USER INTERFACES FOR COMPLIANCE NOTIFICATIONS

FIGS. 9A and 9B illustrate exemplary interfaces associated alerting a customer to the status of building code compliance corresponding to their devices. An electronic device (e.g., a smartphone or mobile device) may be configured to display the interfaces and receive selections and inputs via the interfaces. For example, a dedicated application associated with an insurance provider and that may be configured to operate on the electronic device may display the interfaces. It should be appreciated that the interfaces are merely examples and that alternative or additional content is envisioned.

FIG. 9A illustrates an exemplary interface 900 including details relating to an alert that a device no longer complies with a building code requirement. In particular, the interface 900 indicates an identity of the device that no longer complies with the building code requirement ("wiring in your kitchen oven") and the building code requirement that is not satisfied ("maximum amperage"). Further, the interface 900 may enable a user to select a corrective action to resolve the non-compliant condition. In particular, the interface 900 may enable the user to select from hiring a repairman and purchasing replacement product. The interface 900 may further provide a cost associated with each corrective action.

FIG. 9B illustrates an exemplary interface 950 including details relating to a compliance report after receiving an update to a set of building code requirements. In particular, the interface 950 may indicate that the building code requirements have been updated and that further information is needed to determine compliance with that requirement. The interface 950 may identify the implicated device ("roofing") and the building code requirement ("solar reflectance"). According to some aspects, the interface 950 may enable the user to select whether to determine compliance now via a "NOW" selection and a "LATER" selection to dismiss the alert screen. In response to receiving a "NOW" selection, the electronic device may present another interface that provides instructions on how to measure the building code requirement, and/or how to hire an inspector to determine compliance with the building code requirement. The exemplary interfaces may include additional, less, or alternate functionality, including functionality described elsewhere herein.

VII. Exemplary Methods for Code Compliance Management

Figure 10:
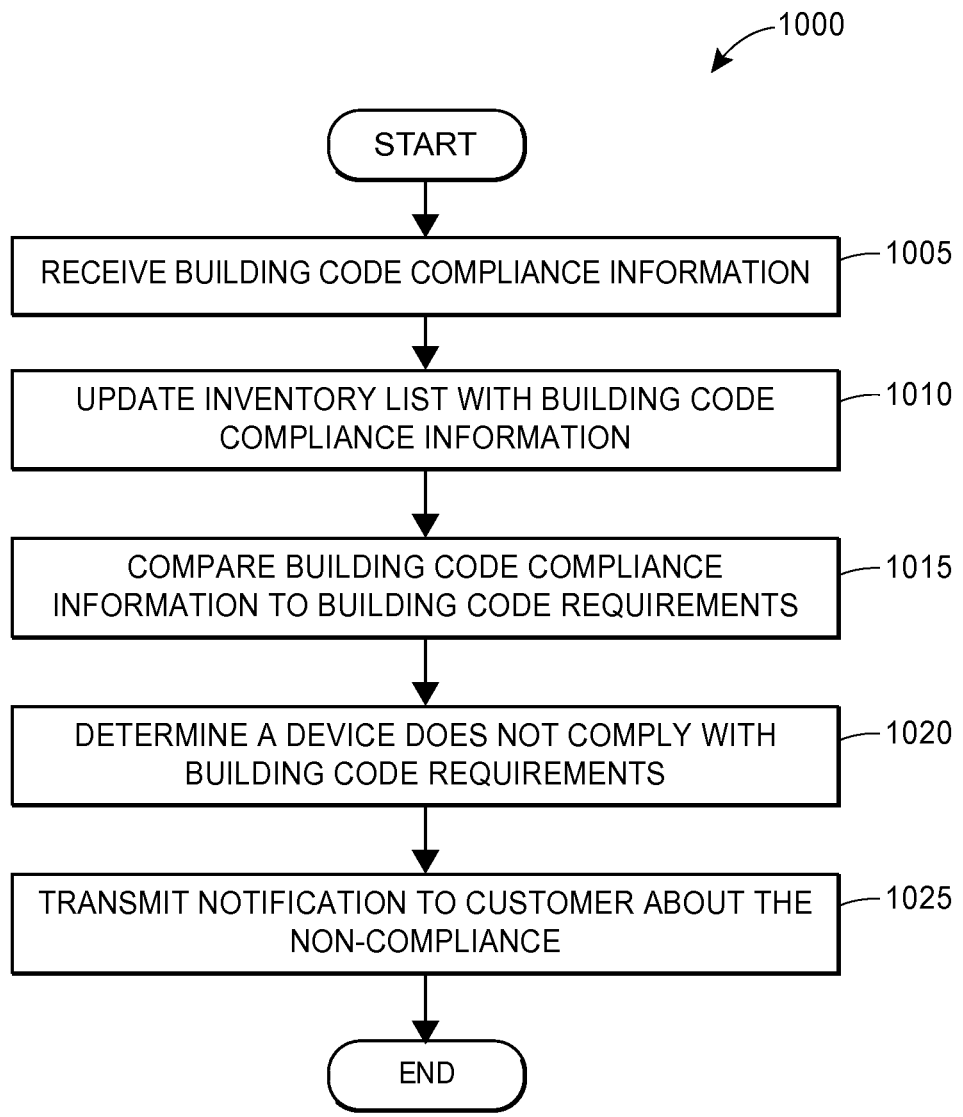
FIG. 10 depicts an exemplary flow diagram associated with managing building code compliance, in accordance with some embodiments.

Referring to FIG. 10, depicted is a block diagram of an exemplary method 1000 of managing building code compliance information for a plurality of devices, such as any of the smart devices 110 as described with respect to FIG. 1. The method 1000 may be facilitated by an electronic device within the property, such as the controller 120, that may be in direct or indirect communication with an insurance provider (such as the insurance provider 130 or a remote processor or server thereof). In some implementations, the controller may store and maintain a digital inventory list of devices disposed on the property.

The method 1000 may begin when the controller receives (block 1005) a building code compliance information from the plurality of devices. The building code compliance information may include a plurality of types of data pertaining to different aspects of the property. For example, the building code compliance information may include ceiling height data, wiring gauge data, fire detector battery data, and/or any other type of data pertaining to building code compliance. The controller may then update (block 1010) the inventory list to store at least a portion of the building code compliance information in a data record for the device from which the building code compliance information was transmitted.

The controller may compare (block 1015) the building code compliance information to the building code requirements to determine whether the property complies with the building code requirements. In particular, the controller may determine that the building code compliance information falls within an allowable range of values indicated by the building code requirements. Based upon this comparison, the controller may determine (block 1020) that the building code compliance information indicates that a particular device does not comply with the building code requirements. For example, the building code compliance information may indicate that a drainage current for the particular devices exceed a maximum allowable limit.

Consequently, the controller may transmit (block 1025) a notification to the customer informing the customer about the non-compliance. In particular, the notification may include an identification of the non-compliant device, an identification of the non-compliant condition, and/or any actions that the customer may perform to correct the non-compliant state. It should be further appreciated that method 1000 may include additional, fewer, and/or alternative actions, including those discussed elsewhere herein.

VIII. Exemplary Building Code Compliance Management Method

In one aspect, a computer-implemented method of managing an insurance policy associated with a property may be provided. The property may be populated with a hardware controller in communication with a plurality of devices and each of the plurality of devices may be configured to monitor various conditions associated with the property. The method may include (1) receiving, by the hardware controller via a first communication network, building code compliance information associated with at least a portion of the plurality of devices; (2) updating, using the building code compliance information, an inventory list associated with the property, the inventory list including the plurality of devices and a set of building code requirements respectively associated with the plurality of devices; (3) comparing, by one or more processors, the building code compliance information to the respective set of building code requirements for each of the plurality of devices; (4) determining, by the one or more processors, that at least one of the plurality of devices does not comply with the set of building code requirements; and/or (5) transmitting, to a customer having the insurance policy via a second communication network, a notification that identifies the at least one of the plurality of devices that does not comply with the set of building code requirements to facilitate building code compliance. The method may include additional, less, or alternate actions, including those discussed elsewhere herein.

For instance, the method may also include (1) receiving, by the hardware controller, the set of building code requirements; (2) for each corresponding device of the plurality of devices stored in the inventory list, analyzing, by the one or more processors, the set of building code requirements to determine whether the set of building code requirements applies to the corresponding device; and/or (3) modifying, by the one or more processors, a data record corresponding to the corresponding device within the inventory list to track an applicable building code requirement of the set of building code requirements.

Prior to transmitting the notification to the customer, the method may include (1) receiving, by the hardware controller via the first communication network, additional building code compliance information associated with the at least one of the plurality of devices, wherein the additional building code information is received after a threshold duration has elapsed; (2) comparing, by one or more processors, the additional building code compliance information to the respective set of building code requirements for each of the portion of the plurality of devices; and/or (3) determining, by the one or more processors, that a portion of the plurality of devices still does not comply with the set of building code requirements after the threshold duration has elapsed.

Transmitting the notification to the customer may include transmitting, to a customer having the insurance policy via the second communication network, the notification. Transmitting the notification may cause an electronic device associated with the customer to enable the customer to select corrective actions. For each of the portion of the plurality of the devices, the corrective action may be at least one of hiring a professional to repair the device and/or purchasing a replacement device. Additionally, the method may include automatically facilitating, by the one or more processors, a performance of the selected corrective actions.

The method may include calculating, by the one or more processors, a modified insurance coverage quote based upon the portion of the plurality of devices not complying with the set of building code requirements; and transmitting, to the customer via the second communication network, the modified insurance coverage quote.

Upon a threshold duration elapsing since determining that the portion of plurality of devices does not comply with the set of building code requirements, the method may include, facilitating, with an insurance provider, a modification to the insurance policy according to the modified insurance coverage quote.

The method may include (1) detecting, by the one or more processors, that the set of building code requirements has been updated; (2) receiving, by the hardware controller via the first communication network, further building code compliance information respectively associated with the portion of the plurality of devices; (3) comparing, by the one or more processors, the further building code compliance information to the updated set of building code requirements; (4) determining, by the one or more processors, that the plurality of devices complies with the updated set of building code requirements; and/or (5) transmitting, to the customer having the insurance policy via the second communication network, a compliance report indicating at least one of a description of the changes to set of building code requirements and/or an indication of whether the plurality of devices complies with the updated set of building code requirements.

Transmitting the compliance report further may include (1) comparing, by the one or more processors, the set of building code requirements to the updated set of building code requirements to determine a set of changed building code requirements reflected in the updated building code; (2) generating, by the one or more processors, the compliance report, wherein the compliance report categorizes each of the set of changed building code requirements into the following categories: (i) the plurality of devices are compliant with the changed building code requirement, (ii) the plurality of devices are non-compliant with the changed building code requirement, and/or (iii) the further building code compliance information lacks sufficient data to determine compliance with the changed building code requirement; and/or (3) transmitting, to the customer having the insurance policy via the second communication network, the generated compliance report.

The method may include (1) receiving, by the hardware controller via the second communication network, manually-determined building code compliance information corresponding to a changed building code requirement categorized as lacking sufficient data to determine compliance; (2) comparing, by the one or more processors, the manually-determined building code compliance information to the corresponding updated building code requirement; (3) determining, by the one or more processors, that the manually-determined building code compliance information indicates compliance with the updated building code requirement; and/or (4) updating, by the one or more processors, the inventory list to indicate compliance with the changed building code requirement.

Upon determining that the manually-determined building code compliance information indicates compliance with the updated building code requirement, the method may include, calculating, by the one or more processors, a modified insurance coverage quote based upon the plurality of devices complying with the changed building code requirement; and transmitting, to the customer via the second communication network, the modified insurance coverage quote.

IX. Exemplary Building Code Compliance Management System

In one aspect, a system for managing an insurance policy associated with a property may be provided. The property may be populated with a hardware controller in communication with the plurality of devices and each of the plurality of devices may be configured to monitor various conditions associated with the property. The system may include (i) a communication module adapted to communicate data; (ii) a memory adapted to store non-transitory computer executable instructions; and/or (iii) one or more processors adapted to interface with the communication module. The one or more processors may be configured to execute the non-transitory computer executable instructions to cause the system to (1) receive, via the communication module, building code compliance information associated with at least a portion of the plurality of devices; (2) update, using the building code compliance information, an inventory list associated with the property, the inventory list including the plurality of devices and a set of building code requirements respectively associated with the plurality of devices; (3) compare, by the one or more processors, the building code compliance information to the respective set of building code requirements for each of the plurality of devices; (4) determine, by the one or more processors, that at least one of the plurality of devices does not comply with the set of building code requirements; and/or (5) transmit, via the communication module, a notification that identifies the at least one of the plurality of devices that does not comply with the set of building code requirements to facilitate building code compliance. The system may include additional, less, or alternate actions, including those discussed elsewhere herein.

For instance, the one or more processors may be further configured to execute the non-transitory computer executable instructions to cause the system to (1) receive, via the communication module, the set of building code requirements; (2) for each corresponding device of the plurality of devices stored in the inventory list, analyze, by the one or more processors, the set of building code requirements to determine whether the set of building code requirements applies to the corresponding device; and/or (3) modify, by the one or more processors, a data record corresponding to the corresponding device within the inventory list to track an applicable building code requirement of the set of building code requirements.

Prior to transmitting the notification to the customer, the one or more processors may be configured to execute the non-transitory computer executable instructions to cause the system to (1) receive, via the communication module, additional building code compliance information associated with the at least one of the plurality of devices, wherein the additional building code information is received after a threshold duration has elapsed; (2) compare, by one or more processors, the additional building code compliance information to the respective set of building code requirements for each of the portion of the plurality of devices; and/or (3) determine, by the one or more processors, that a portion of the plurality of devices still does not comply with the set of building code requirements after the threshold duration has elapsed.

To transmit the notification to the customer, the one or more processors may be configured to execute the non-transitory computer executable instructions to cause the system to transmit, to a customer having the insurance policy via the communication module, the notification. Transmitting the notification may cause an electronic device associated with the customer to enable the customer to select corrective actions. For each of the portion of the plurality of the devices, the corrective action may be at least one of hiring a professional to repair the device and/or purchasing a replacement device. The system may also automatically facilitate, by the one or more processors, a performance of the selected corrective actions.

The one or more processors may be configured to execute the non-transitory computer executable instructions to cause the system to calculate, by the one or more processors, a modified insurance coverage quote based upon the portion of the plurality of devices not complying with the set of building code requirements; and/or transmit, to the customer via the communication module, the modified insurance coverage quote.

Upon a threshold duration elapsing since determining that the portion of plurality of devices does not comply with the set of building code requirements, the one or more processors may be configured to execute the non-transitory computer executable instructions to cause the system to facilitate, with an insurance provider, a modification to the insurance policy according to the modified insurance coverage quote.

The one or more processors may be configured to execute the non-transitory computer executable instructions to cause the system to (1) detect, by the one or more processors, that the set of building code requirements has been updated; (2) receive, via the communication module, further building code compliance information respectively associated with the portion of the plurality of devices; (3) compare, by the one or more processors, the further building code compliance information to the updated set of building code requirements; (4) determine, by the one or more processors, that the plurality of devices complies with the updated set of building code requirements; and/or (5) transmit, to the customer having the insurance policy via the communication module, a compliance report indicating at least one of a description of the changes to set of building code requirements and/or an indication of whether the plurality of devices complies with the updated set of building code requirements.

To transmit the compliance report, the one or more processors may be configured to execute the non-transitory computer executable instructions to cause the system to (1) compare, by the one or more processors, the set of building code requirements to the updated set of building code requirements to determine a set of changed building code requirements reflected in the updated building code; (2) generate, by the one or more processors, the compliance report, wherein the compliance report categorizes each of the set of changed building code requirements into the following categories (i) the plurality of devices are compliant with the changed building code requirement, (ii) the plurality of devices are non-compliant with the changed building code requirement, and/or (iii) the further building code compliance information lacks sufficient data to determine compliance with the changed building code requirement; and/or (3) transmit, to the customer having the insurance policy via the communication module, the generated compliance report.

The one or more processors may be configured to execute the non-transitory computer executable instructions to cause the system to (1) receive, via the communication module, manually-determined building code compliance information corresponding to a changed building code requirement categorized as lacking sufficient data to determine compliance; (2) compare, by the one or more processors, the manually-determined building code compliance information to the corresponding updated building code requirement; (3) determine, by the one or more processors, that the manually-determined building code compliance information indicates compliance with the updated building code requirement; and/or (4) update, by the one or more processors, the inventory list to indicate compliance with the changed building code requirement.

X. Exemplary Controller

Figure 11:
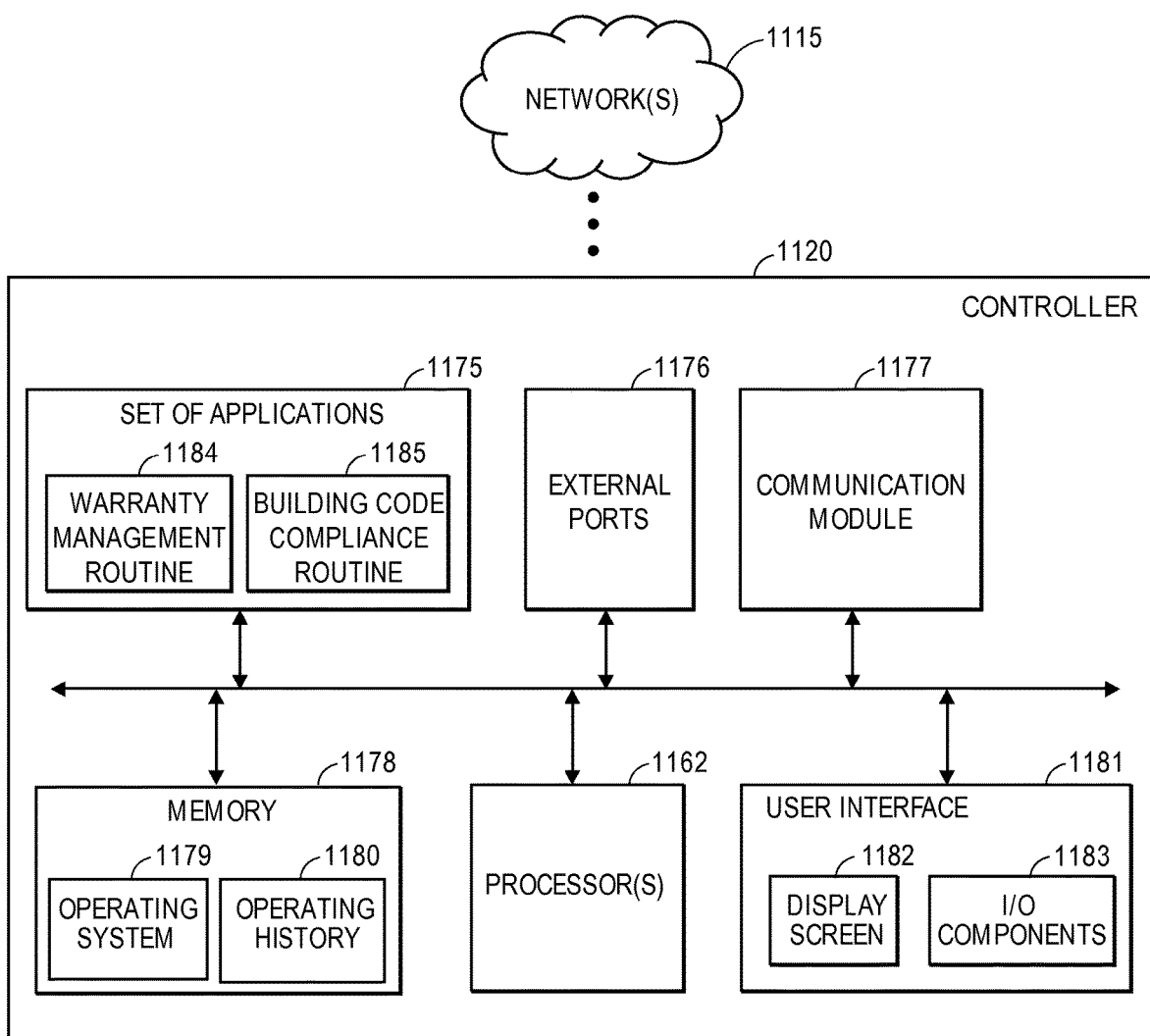
FIG. 11 is a block diagram of an exemplary controller, in accordance with some embodiments.

FIG. 11 illustrates a diagram of an exemplary smart home controller 1120 (such as the smart home controller 120 as discussed with respect to FIG. 1) in which the functionalities as discussed herein may be implemented. The controller 1120 may be a smart or interconnected home controller. It should be appreciated that the smart home controller 1120 may be associated with a property, as discussed elsewhere herein.

The controller 1120 may include a processor 1162, as well as a memory 1178. The memory 1178 may store an operating system 1179 capable of facilitating the functionalities as described herein. The controller 1120 may also store a set of applications 1175 (i.e., machine readable instructions). For example, the set of applications 875 may include a warranty management routine 1184 configured monitor warranty information to detect when a warranty is about to expire and/or a building code compliance routine 1185 configured to detect that a device is not compliant with a building code requirement. It should be appreciated that other applications are envisioned.

The processor 1162 may interface with the memory 1178 to execute the operating system 1179 and the set of applications 1175. According to some embodiments, the memory 1178 may also include inventory list 1180 that includes information related to the plurality of smart devices on the premises of the property. The warranty management routine 1184 and/or the building code compliance routine 1185 may access the inventory list 1180 to monitor warranty information and/or building code compliance, respectively, for a smart device. The memory 1178 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The controller 1120 may further include a communication module 1177 configured to communicate data via one or more networks 1115, such as via wireless communication and/or data transmission. Network(s) 1115 may include both a local network for communicating between devices on, or proximate to, the property and a remote network for communicating between the property and external parties.

According to some embodiments, the communication module 1177 may include one or more transceivers (e.g., WWAN, WLAN, and/or WPAN transceivers) functioning in accordance with IEEE standards, 3GPP standards, or other standards, and configured to receive and transmit data via one or more external ports 1176. In some embodiments, the communication module 1177 may include separate transceivers configured to interact with the local and remote networks separately. The controller 1120 may further include a user interface 1181 configured to present information to a user and/or receive inputs from the user. As shown in FIG. 11, the user interface 1181 may include a display screen 1182 and I/O components 1183 (e.g., ports, capacitive or resistive touch sensitive input panels, keys, buttons, lights, LEDs, speakers, microphones).

According to the present embodiments, the user may access the controller 1120 via the user interface 1181 to monitor the status of the plurality of smart devices associated with a property, update the inventory list 1180 including the plurality of smart devices associated with the property, and/or perform other functions. In some embodiments, the controller 1120 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code is adapted to be executed by the processor 1162 (e.g., working in connection with the operating system 1179) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML). In some embodiments, the computer program product may be part of a cloud network of resources. It should be appreciated that the controller 1120 may include additional, less, or alternate components, including those discussed elsewhere herein.

XI. Additional Embodiments

The present embodiments may relate to, inter alia, managing operation of devices or personal property within a home or other type of property, such as household furniture, appliances, electronics, vehicles (e.g., cars, boats, motorcycles), and/or other personal belongings (e.g., clothing, jewelry, antiques). Generally, a home or property may have a "smart" central controller that may be wirelessly connected, or connected via hard-wire, with various household related items, devices, and/or sensors. The central controller may be associated with any type of property, such as homes, office buildings, restaurants, farms, and/or other types of properties.

The central controller, and/or one or more remote processors or servers associated with an insurance provider, may be in wireless or wired communication with various "smart" items or devices, such as smart appliances (e.g., clothes washer, dryer, dish washer, refrigerator, etc.); smart heating devices (e.g., furnace, space heater, etc.); smart cooling devices (e.g., air conditioning units, fans, ceiling fans, etc.); smart plumbing fixtures (e.g., toilets, showers, water heaters, piping, interior and yard sprinklers, etc.); smart cooking devices (e.g., stoves, ovens, grills, microwaves, etc.); smart wiring, lighting, and lamps; smart personal vehicles; smart thermostats; smart windows, doors, or garage doors; smart window blinds or shutters; and/or other smart devices and/or sensors capable of wireless or wired communication. Each smart device (or sensor associated therewith), as well as the central controller and/or insurance provider remote processor(s), may be equipped with a processor, memory unit, software applications, wireless transceivers, local power supply, various types of sensors, and/or other components.

The central controller, and/or insurance provider remote processor(s), may collect or retrieve various data from the devices or personal property, analyze the data, and/or identify various actions to facilitate based upon the analysis. In particular, the central controller, and/or insurance provider remote processor(s), may issue commands to the devices or otherwise control operation of the devices. Upon receipt, the appropriate device may execute the command(s) to cause the smart device to perform an action or enter a preferred operation state. The central controller, and/or insurance provider remote processor(s), may also generate notifications of various operation states or completed actions, and communicate the notifications to individuals associated with the property.

Generally, the systems and methods offer numerous benefits to operation of devices within the property, as well as to individuals associated with the property. In particular, the systems and methods may automatically detect potential or actual issues with the property that the individuals may not realize exist, and may automatically facilitate preventative or corrective actions to address the issues. As a result, security associated with the property may improve. Further, the systems and methods improve loss prevention and mitigate actual loss. The systems and methods further apply to independent and/or assisted living situations, whereby patients may receive improved care and individuals associated with the patients may realize more effective communication. Additionally, the systems and methods may improve energy consumption.

The systems and methods may further offer a benefit to insurance providers and customers thereof. Particularly, the present embodiments may facilitate (a) providing and updating insurance policies; (b) the handling or adjusting of home insurance claims; (c) the disbursement of monies related to insurance claims; (d) modifying insurance coverage amounts; (e) updating and improving damage estimate models, and/or (f) other insurance-related activities. The systems and methods may further offer a benefit to customers by offering improved insurance claim processing. Further, the insurance providers may stand out as a cost-effective insurance provider, thereby retaining existing customers and attracting new customers. It should be appreciated that further benefits to the systems and methods are envisioned.

The method may also include adjusting an insurance policy, premium, or discount (such as a homeowners, renters, auto, home, health, or life insurance policy, premium, or discount) based upon the warranty and/or building code, and/or other functionality discussed herein, and/or an insured having a home and/or mobile device with such functionality.

In some embodiments, wired or wireless communication or data transmission, and/or data, received and/or analyzed by the smart home controller or remote processor may indicate that the insured home needs improvements to bring the insured home up to new or existing building codes, and/or to reduce a risk of loss (i.e., wiring and/or plumbing of the insured home needs upgrades or improvements). In one embodiment, the smart home controller or remote processor may receive a data transmission or data, or otherwise access data (such as via the internet or other wired or wireless communication), associated with an update to a building code; and the smart home controller or remote processor may analyze the wired or wireless communication or data transmission, and/or data, to identify areas of the insured home that need to be updated (e.g., wiring or plumbing) and/or determine recommended updates or upgrades to be performed on the insured home to bring the insured home into compliance with the updated building code, and/or notify the insured of the recommended updates or upgrades to the insured home, such as via wireless communication.

XII. Exemplary Method for Building Code Compliance

In one aspect, a computer-implemented method of managing building code compliance of a property may be provided. The property may be populated with a hardware controller in communication with the plurality of devices. Each of the plurality of devices may be configured to monitor various conditions associated with the property. The method may include (1) receiving, by the hardware controller via a communication network, an update to a building code corresponding to the property; (2) receiving, by the hardware controller via the communication network, a first set of sensor data from at least one of the plurality of devices; (3) determining, by one or more processors, whether the first set of sensor data indicates that the property complies with the update to the building code; and/or (4) transmitting, via the communication network, a notification to an individual associated with the property, wherein the notification indicates the update to the building code and/or whether the property complies with the update to the building code to facilitate alleviating risks associated with insurance-related events, abnormal conditions, and/or buildings not in compliance with code. The method may include additional, fewer, or alternate actions, including those discussed elsewhere herein.

For instance, to determine whether the first set of sensor indicates that the property complies with the update to the building code, the method may include (1) determining, by the one or more processors, a set of changed property requirements reflected in the update to the building code; and/or (2) generating, by the one or more processors, a compliance report, wherein the compliance report categorizes each of the set of changed property requirements into whether the first set of sensor data contains data that indicates compliance with the respective changed property requirement, a non-compliance with the respective changed property requirement, and/or a lack of data to determine compliance with the respective changed property requirement.

The method may also include receiving, by the hardware controller via the communication network, a confirmation that the individual associated with the property manually confirmed compliance with at least one property that is part of the set of changed property requirements lacking of data to determine compliance.

The method may further include (1) determining, by the one or more processors, that one of the set of changed property requirements is non-compliant by (2) receiving, by the hardware controller via the communication network, an indication that the individual associated with the property manually determined that the one of the set of changed property requirements is non-compliant.

The method may still further include (1) receiving, by the hardware controller via the communication network, a second set of sensor data from at least one of the plurality of devices; and/or (2) determining, by the one or more processors, that the second set of received sensor data contains data indicating that the one of the set of changed property requirements is now compliant. The method may yet further include transmitting, via the communication network, a notification to the individual associated with the property indicating that the one of the set of changed property requirements is now compliant.

XII. Additional Considerations

As used herein, the term "smart" may refer to devices, sensors, or appliances located within or proximate to a property, and with the ability to communicate information about the status of the device, sensor, or appliance and/or receive instructions that control the operation of the device, sensor, or appliance, such as via wired or wireless communication or data transmissions. For example, a smart thermostat may be able to remotely communicate the current temperature of the home and receive instructions to adjust the temperature to a new level. As another example, a smart water tank may be able to remotely communicate the water level contained therein and receive instructions to restrict the flow of water leaving the tank. In contrast, "dumb" devices, sensors, or appliances located within or proximate to a property may require manual control. Referring again to the thermostat example, to adjust the temperature on a "dumb" thermostat, a person may have to manually interact with the thermostat. As such, a person may be unable to use a communication network to remotely adjust a "dumb" device, sensor, or appliance.

A "smart device" as used herein may refer to any of a smart device, sensor, appliance, and/or other smart equipment that may be located on the premises of a property. In some embodiments in which an appliance and a sensor external to the particular appliance are associated with each other, "smart device" may refer to both the external sensors and the appliance collectively. Some examples of devices that may be "smart devices" are, without limitation, valves, piping, clothes washers/dryers, dish washers, refrigerators, sprinkler systems, toilets, showers, sinks, soil monitors, doors, locks, windows, shutters, ovens, grills, fire places, furnaces, lighting, sump pumps, security cameras, and alarm systems. Similarly, an individual associated with the property shall be referred to as the "homeowner," "property owner," or "policyholder," but it is also envisioned that the individual may be a family member of the homeowner, a person renting/subletting the property, a person living or working on the property, a neighbor of the property, or any other individual that may have an interest in preventing or mitigating damage to the property.

Further, any reference to "home" or "property" is meant to be exemplary and not limiting. The systems and methods described herein may be applied to any property, such as homes, offices, farms, lots, parks, apartments, condos, and/or other types of properties or buildings. Accordingly, "homeowner" may be used interchangeably with "property owner."

With the foregoing, an insurance customer may opt-in to a rewards, insurance discount, or other type of program. After the insurance customer provides their affirmative consent, an insurance provider remote server may collect data from the customer's mobile device, smart home controller, or other smart devices—such as with the customer's permission. The data collected may be related to insured assets before (and/or after) an insurance-related event, including those events discussed elsewhere herein. In return, risk averse insureds, home owners, or home or apartment occupants may receive discounts or insurance cost savings related to home, renters, personal articles, auto, and other types of insurance from the insurance provider based upon employing or otherwise having the functionality (such as warranty management or building code compliance functionality) discussed herein.

In one aspect, smart or interconnected home data, and/or other data, including the types of data discussed elsewhere herein, may be collected or received by an insurance provider remote server, such as via direct or indirect wireless communication or data transmission from a smart home controller, mobile device, or other customer computing device, after a customer affirmatively consents or otherwise opts-in to an insurance discount, reward, or other program. The insurance provider may then analyze the data received with the customer's permission to provide benefits to the customer. As a result, risk averse customers may receive insurance discounts or other insurance cost savings based upon data that reflects low risk behavior and/or technology that mitigates or prevents risk to (i) insured assets, such as homes, personal belongings, or vehicles, and/or (ii) home or apartment occupants.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

The terms "insurer," "insuring party," and "insurance provider" are used interchangeably herein to generally refer to a party or entity (e.g., a business or other organizational entity) that provides insurance products, e.g., by offering and issuing insurance policies. Typically, but not necessarily, an insurance provider may be an insurance company.

Although the embodiments discussed herein relate to home or personal property insurance policies, it should be appreciated that an insurance provider may offer or provide one or more different types of insurance policies. Other types of insurance policies may include, for example, condominium owner insurance, renter's insurance, life insurance (e.g., whole-life, universal, variable, term), health insurance, disability insurance, long-term care insurance, annuities, business insurance (e.g., property, liability, commercial auto, workers compensation, professional and specialty liability, inland marine and mobile property, surety and fidelity bonds), automobile insurance, boat insurance, insurance for catastrophic events such as flood, fire, volcano damage and the like, motorcycle insurance, farm and ranch insurance, personal liability insurance, personal umbrella insurance, community organization insurance (e.g., for associations, religious organizations, cooperatives), and other types of insurance products. In embodiments as described herein, the insurance providers process claims related to insurance policies that cover one or more properties (e.g., homes, automobiles, personal property), although processing other insurance policies may also be envisioned.

The terms "insured," "insured party," "policyholder," "customer," "claimant," and "potential claimant" are used interchangeably herein to refer to a person, party, or entity (e.g., a business or other organizational entity) that is covered by the insurance policy, e.g., whose insured article or entity (e.g., property, life, health, auto, home, business) is covered by the policy. A "guarantor," as used herein, generally refers to a person, party or entity that is responsible for payment of the insurance premiums. The guarantor may or may not be the same party as the insured, such as in situations when a guarantor has power of attorney for the insured. An "annuitant," as referred to herein, generally refers to a person, party or entity that is entitled to receive benefits from an annuity insurance product offered by the insuring party. The annuitant may or may not be the same party as the guarantor.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

The patent claims at the end of this patent application are not intended to be construed under 35 U.S.C. § 112(f) unless traditional means-plus-function language is expressly recited, such as "means for" or "step for" language being explicitly recited in the claim(s).

This detailed description is to be construed as examples and does not describe every possible embodiment, as describing every possible embodiment would be impractical, if not impossible. One could implement numerous alternate embodiments, using either current technology or technology developed after the filing date of this application.

What is claimed:

1. A computer-implemented method of managing building code compliance of devices located in a property, the method comprising:
    comparing, by a processor, building code compliance information for each of the devices to building code requirements;
    transmitting, to a customer, a notification that identifies at least one device that does not comply with the building code requirements;
    automatically comparing, by the processor and without human monitoring or intervention, the building code requirements to updated building code requirements to determine changed building code requirements;
    automatically generating, by the processor and without human monitoring or intervention, a compliance report indicating that the devices are compliant with the changed building code requirements, the devices are non-compliant with the changed building code requirements, or the building code compliance information lacks sufficient data to determine compliance with the changed building code requirements; and
    transmitting the compliance report to the customer.

2. The computer-implemented method of claim 1, further comprising:
- receiving, by a hardware controller, the building code requirements;
- for each corresponding device, analyzing, by the processor, the building code requirements to determine whether the building code requirements applies to the corresponding device; and
- modifying, by the processor, a data record corresponding to the corresponding device within an inventory list to track an applicable building code requirement of the building code requirements.

3. The computer-implemented method of claim 1, wherein prior to transmitting the notification to the customer, the method further comprises:
- receiving, by a hardware controller, additional building code compliance information associated with the at least one device, wherein the additional building code information is received after a threshold duration has elapsed;
- comparing, by the processor, the additional building code compliance information to the building code requirements; and
- determining, by the processor, that the at least one device still does not comply with the building code requirements after the threshold duration has elapsed.

4. The computer-implemented method of claim 1, wherein transmitting the notification to the customer comprises:
- transmitting, to a customer having an insurance policy associated with the property, the notification, wherein transmitting the notification causes an electronic device associated with the customer to enable the customer to select corrective actions including at least one of hiring a professional to repair the at least one device or purchasing a replacement device; and
- automatically facilitating, by the processor, a performance of the selected corrective actions.

5. The computer-implemented method of claim 1, further comprising:
- calculating, by the processor, a modified insurance coverage quote based upon the at least one device not complying with the building code requirements; and
- transmitting, to the customer, the modified insurance coverage quote.

6. The computer-implemented method of claim 5, further comprising:
- upon a threshold duration elapsing since determining that the at least one device does not comply with the building code requirements, facilitating, with an insurance provider, a modification to an insurance policy according to the modified insurance coverage quote.

7. The computer-implemented method of claim 1, further comprising:
- detecting, by the processor, that the building code requirements have been updated;
- comparing, by the processor, further building code compliance information respectively associated with the devices to the updated building code requirements;
- determining, by the processor, that the devices comply with the updated building code requirements; and
- transmitting, to the customer, another compliance report indicating at least one of a description of the changes to the building code requirements or an indication of whether the devices comply with the updated building code requirements.

8. The computer-implemented method of claim 1, further comprising:
- receiving, by the hardware controller, manually-determined building code compliance information corresponding to an updated building code requirement categorized as lacking sufficient data to determine compliance;
- comparing, by the processor, the manually-determined building code compliance information to the corresponding updated building code requirement;
- determining, by the processor, that the manually-determined building code compliance information indicates compliance with the updated building code requirement; and
- updating, by the processor, an inventory list to indicate compliance with the updated building code requirement.

9. The computer-implemented method of claim 8, further comprising:
- upon determining that the manually-determined building code compliance information indicates compliance with the updated building code requirement, calculating, by the processor, a modified insurance coverage quote based upon the devices complying with the changed building code requirement; and
- transmitting, to the customer, the modified insurance coverage quote.

10. A system for managing building code compliance of devices located in a property, the system comprising:
- a communication module;
- a memory adapted to store non-transitory computer executable instructions; and
- a processor adapted to interface with the communication module, wherein the processor is configured to execute the non-transitory computer executable instructions to cause the system to:
  - compare, by the processor, building code compliance information for each of the devices to building code requirements;
  - determine, by the processor, that at least one device does not comply with the building code requirements;
  - transmit, via the communication module, to a customer a notification that identifies the at least one device that does not comply with the building code requirements;
  - automatically compare, by the processor and without human monitoring or intervention, the building code requirements to updated building code requirements to determine changed building code requirements;
  - automatically generate, by the processor and without human monitoring or intervention, a compliance report indicating that the devices are compliant with the changed building code requirements, the devices are non-compliant with the changed building code requirements, or the building code compliance information lacks sufficient data to determine compliance with the changed building code requirements; and
  - transmit the compliance report to the customer.

11. The system of claim 10, wherein the processor is further configured to execute the non-transitory computer executable instructions to cause the system to:
- receive, via the communication module, the building code requirements;
- for each corresponding device, analyze, by the processor, the building code requirements to determine whether the building code requirements apply to the corresponding device; and modify, by the processor, a data record corresponding to the corresponding device within an inventory list to track an applicable building code requirement of the building code requirements.

12. The system of claim 10, wherein prior to transmitting the notification to the customer, the processor is further configured to execute the non-transitory computer executable instructions to cause the system to:
receive, via the communication module, additional building code compliance information associated with the at least one device, wherein the additional building code compliance information is received after a first time period;
compare, by one or more processors, the additional building code compliance information to the building code requirements; and
determine, by the processor, that the at least one device still does not comply with the building code requirements after the first time period has elapsed.

13. The system of claim 10, wherein to transmit the notification to the customer, the processor is further configured to execute the non-transitory computer executable instructions to cause the system to:
transmit, via the communication module, the notification to an electronic device associated with a customer having an insurance policy, thereby causing the electronic device to enable the customer to select corrective actions including at least one of hiring a professional to repair the at least one device or purchasing a replacement device; and
automatically facilitate, by the processor, a performance of the selected corrective actions.

14. The system of claim 10, wherein the processor is further configured to execute the non-transitory computer executable instructions to cause the system to:
calculate, by the processor, a modified insurance coverage quote based upon the at least one device not complying with the building code requirements; and
transmit, to the customer via the communication module, the modified insurance coverage quote.

15. The system of claim 14, wherein the processor is further configured to execute the non-transitory computer executable instructions to cause the system to:
after a first time period has elapsed since determining that the at least one device does not comply with the building code requirements, facilitate, with an insurance provider, a modification to an insurance policy according to the modified insurance coverage quote.

16. The system of claim 10, wherein the processor is further configured to execute the non-transitory computer executable instructions to cause the system to:
detect, by the processor, that the building code requirements have been updated;
receive, via the communication module, further building code compliance information respectively associated with the devices;
compare, by the processor, the further building code compliance information to the updated building code requirements;
determine, by the processor, that the devices comply with the updated building code requirements; and
transmit, to the customer via the communication module, another compliance report indicating at least one of a description of the changes to building code requirements or an indication of whether the devices comply with the updated building code requirements.

17. The computer-implemented method of claim 10, wherein the processor is further configured to execute the non-transitory computer executable instructions to cause the system to:
receive, via the communication module, manually-determined building code compliance information corresponding to an updated building code requirement categorized as lacking sufficient data to determine compliance;
compare, by the processor, the manually-determined building code compliance information to the corresponding updated building code requirement;
determine, by the processor, that the manually-determined building code compliance information indicates compliance with the updated building code requirement; and
update, by the processor, an inventory list to indicate compliance with the updated building code requirement.

18. A non-transitory computer-readable storage medium storing processor-executable instructions, that when executed cause a processor to:
compare, by the processor, building code compliance information for each of a plurality of devices associated with a property to a building code requirements;
determine, by the processor, that at least one device does not comply with the building code requirements;
transmit, to a customer via a remote communication network, a notification that identifies the at least one device that does not comply with the building code requirements;
compare, by the processor and without human monitoring or intervention, the building code requirements to updated building code requirements to determine a set of changed building code requirements;
generate, by the processor and without human monitoring or intervention, a compliance report indicating that the devices are compliant with the changed building code requirements, the devices are non-compliant with the changed building code requirements, or the building code compliance information lacks sufficient data to determine compliance with the changed building code requirements; and
transmit the compliance report to the customer via the remote communication network.

19. The non-transitory computer-readable storage medium storing processor-executable instructions of claim 18, wherein transmitting the notification to the customer comprises:
transmitting the notification to an electronic device associated with a customer having an insurance policy, thereby causing the electronic device to enable the customer to select corrective actions including at least one of hiring a professional to repair the at least one device or purchasing a replacement device; and
automatically facilitating, by the processor, a performance of the selected corrective actions.

20. The non-transitory computer-readable storage medium storing processor-executable instructions of claim 18, wherein execution of the instructions by the processor further cause the processor to:
calculate a modified insurance coverage quote based upon the at least one device not complying with the building code requirements; and transmit, to the customer, the modified insurance coverage quote.

\* \* \* \* \*